(12) United States Patent
Chawla et al.

(10) Patent No.: US 11,669,895 B1
(45) Date of Patent: Jun. 6, 2023

(54) DIGITAL BANKER APPLICATION SYSTEM

(71) Applicant: Wells Fargo Bank, N.A., San Francisco, CA (US)

(72) Inventors: Poonam Chawla, San Francisco, CA (US); Prafullata Diwate, Walnut Creek, CA (US); Alicia Laramy, El Monte, CA (US); Jason Martin, Charlotte, NC (US); Nirmal Masih, Tega Cay, SC (US); Stephen Nixon, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/006,278

(22) Filed: Aug. 28, 2020

(51) Int. Cl.
G06Q 40/02 (2023.01)
G06Q 20/40 (2012.01)
G06Q 20/32 (2012.01)

(52) U.S. Cl.
CPC ......... *G06Q 40/02* (2013.01); *G06Q 20/3276* (2013.01); *G06Q 20/3278* (2013.01); *G06Q 20/40145* (2013.01)

(58) Field of Classification Search
None
See application file for complete search history.

(56) References Cited

U.S. PATENT DOCUMENTS

| | | | |
|---|---|---|---|
| 8,843,939 B2 | 9/2014 | Lesandro et al. | |
| 9,508,070 B2 | 11/2016 | Grigg et al. | |
| 9,619,794 B2 | 4/2017 | Zhou et al. | |
| 9,830,589 B2 | 11/2017 | Xing | |
| 9,876,803 B2 | 1/2018 | Miu et al. | |
| 9,916,736 B2 | 3/2018 | Block et al. | |
| 10,135,802 B2 | 11/2018 | Miu | |
| 10,366,378 B1 | 7/2019 | Han et al. | |
| 10,445,732 B2 | 10/2019 | Oberheide et al. | |
| 10,504,077 B1 | 12/2019 | Hu et al. | |
| 10,521,794 B2 | 12/2019 | Dimmick | |
| 2008/0189185 A1* | 8/2008 | Matsuo | G06Q 20/202 705/21 |
| 2012/0054095 A1 | 3/2012 | Lesandro et al. | |
| 2012/0191611 A1 | 7/2012 | Kelly et al. | |
| 2014/0136354 A1 | 5/2014 | Emery et al. | |
| 2014/0279537 A1 | 9/2014 | Cicoretti | |
| 2014/0372184 A1 | 12/2014 | Blumenthal | |

(Continued)

*Primary Examiner* — Namrata Boveja
*Assistant Examiner* — Amit Patel
(74) *Attorney, Agent, or Firm* — Foley & Lardner LLP

(57) ABSTRACT

A computing system includes a network interface circuit and a processing circuit comprising one or more processors coupled to non-transitory memory storing instructions that when executed by the one or more processors, cause the processing circuit to generate a first code displayable for capture by a customer device associated with a customer, generate a second code confirming an identity of the customer, provide the second code to a mobile device, receive customer information and an indication of a capture of the first code from the customer device, in response to receiving the second code from the customer device within a pre-defined parameter of the receiving of the customer information and the indication of the capturing of the first code from the customer device, analyze the customer information, and in response to verifying the customer information based on the analysis, cause an activation on behalf of the customer.

9 Claims, 10 Drawing Sheets

(56) References Cited

U.S. PATENT DOCUMENTS

| | | |
|---|---|---|
| 2016/0012465 A1 | 1/2016 | Sharp |
| 2016/0219039 A1 | 7/2016 | Houthooft et al. |
| 2017/0053260 A1 | 2/2017 | Zhou et al. |
| 2018/0096351 A1 | 4/2018 | Dahn |
| 2018/0130162 A1 | 5/2018 | Manilla |
| 2018/0204281 A1 | 7/2018 | Painter et al. |
| 2019/0066089 A1 | 2/2019 | Miryala et al. |
| 2019/0073711 A1 | 3/2019 | Parikh |
| 2019/0130510 A1 | 5/2019 | Bachkethi |
| 2019/0385160 A1 | 12/2019 | Safak et al. |

* cited by examiner

DIGITAL BANKER APPLICATION SYSTEM

TECHNICAL FIELD

The present disclosure relates to technical communication processes. More particularly, the present disclosure relates to particular communication processes of a digital banker application system.

BACKGROUND

In the United States, provider institutions, such as banks and credit unions, are required by law to have a Customer Identification Program (CIP) (e.g., a Know You Customer (KYC) program) for the creation of new accounts. A new account may include, but is not limited to, a deposit account, an extension of credit, or the rental of a safe deposit box. Typically, a bank must obtain at least the name of the applicant associated with the account, the date of birth (for an individual) of the applicant associated with the account, the address of an individual, and an identification number. A provider institution's CIP is intended to enable the provider institution to form a reasonable belief that the provider institution knows the true identity of each customer before allowing the customer to perform one or more actions (e.g., open an account).

SUMMARY

A first example embodiment relates to a computing system. The computing system includes a network interface circuit structured to facilitate data transmission over a network, and a processing circuit comprising one or more processors coupled to non-transitory memory storing instructions that when executed by the one or more processors, cause the processing circuit to generate a first code specific to at least one of an individual or an event, the first code being displayable for capture by a customer device associated with a customer generate a second code confirming an identity of the customer, provide the second code to a mobile device different from the customer device, receive customer information and an indication of a capture of the first code from the customer device, in response to receiving the second code from the customer device within a predefined parameter of the receiving of the customer information and the indication of the capturing of the first code from the customer device, analyze the customer information, and in response to verifying the customer information based on the analysis, cause an activation on behalf of the customer, the activation being viewable on the customer device.

Another example embodiment relates to a computing device. The computing device includes a processing circuit comprising one or more processors coupled to non-transitory memory, wherein the processing circuit is configured to capture a first code, launch a web browser in response to capturing the first code thereby causing a display of a graphical user interface comprising one or more fillable fields with at least one of the one or more fillable fields populated with information from the captured first code, receive a customer input to populate an additional one or more fillable fields relative to the at least one of the one or more fillable fields to form preliminary account application information, send the preliminary account application information to a provider computing system, wherein the preliminary account application information identifies a customer, receive authentication instructions from the provider computing system in response to sending the preliminary account application information to verify a customer's identity, receive and send a second code to the provider computing system based on a short range wireless communication of the second code from a second computing device to the computing device, and access an account that is opened in response to the second code being received by the provider computing system.

Another example embodiment relates to an account opening system. The account opening system includes a network interface circuit structured to facilitate data transmission over a network, and a processing circuit comprising one or more processors coupled to non-transitory memory, wherein the processing circuit is configured to provide an account application instruction to a customer device operated by a customer, wherein the account application instruction is provided to the customer device in response to a first code being captured by the customer device, receive preliminary account information from the customer device, receive a second code from the customer device, wherein the second code is provided to the customer device in response to a verification of a customer's identity, and open an account in response to receiving the second code, wherein the account may be accessed by the customer device.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
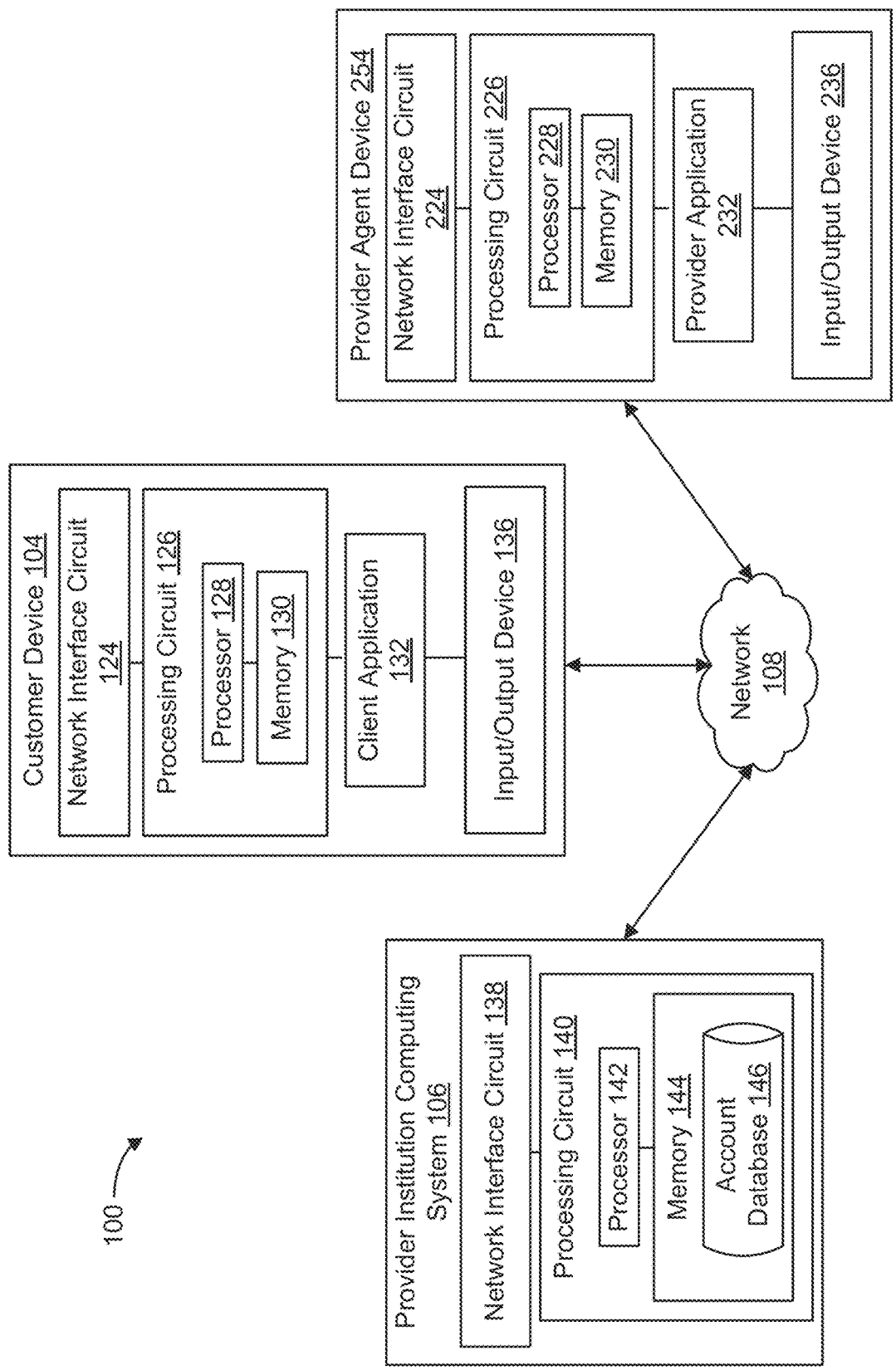
FIG. 1 is a schematic view of a digital banker application system, according to an example embodiment.

Referring generally to the Figures, systems and methods for a digital banker application are disclosed. According to various example embodiments, a digital banker application system allows a provider institution to open an account for a customer (e.g., a client, potential client, customer, potential customer, etc.) according to a particular technical communication process. The digital banker application system allows a provider institution to open an account for a customer at a remote location relative to a local bank branch, such as at a college campus, another business, a pop-up shop, a shopping center, etc. In other arrangements, the digital banker application system may allow a provider institution to open an account for a customer at a local bank branch. In operation, the digital account opening system allows a provider institution to authenticate the identity of a customer at a remote location to allow the customer to complete an account application and open an account at the remote location relative to a branch of the provider institution.

In the United States, and elsewhere around the world, provider institutions may be required to have a Customer Identification Program (CIP). For example, in the United States, a provider institution must have certain procedures in place to confirm the identity of any person that wishes to open an account with the provider institution. In the United States, the CIP rule provides examples of types of documents that are considered primary sources of identification. Examples include a driver's license or passport. However, other forms of identification may be used if identification document enables the provider institution to form a reasonable belief that it knows the true identity of the customer. Given the availability of counterfeit and fraudulently obtained documents, a provider institution is encouraged to review more than a single document to ensure that it has a reasonable belief that it knows the customer's true identity. Due to the prevalence of counterfeit and fraudulently obtained documents, in some situations, a provider institution's CIP and/or KYC program require a physical form of identification be presented to an agent of the provider institution to open a new account. Therefore, there are situations where an account cannot be opened exclusively through a digital application.

Some provider institutions may require an employee to manually check a customer's form of identification (e.g., passport, driver's license, birth certificate, Social Security card, student ID, credit card, debit card, insurance card, etc.) as a part of the provider institution's CIP. For example, a customer (e.g., customer, account holder, credit union member, etc.) may physically visit a local branch of a provider institution to open a savings account with the provider institution. The customer may then fill out preliminary information (e.g., name of the customer, birthdate of the customer, address of the customer, type of account, identification number, etc.) in an application to open an account. After the customer has completed the preliminary information, the customer may then present the partially completed or completed application to open an account to an agent (e.g., employee) at the local branch of the provider institution, along with a form, or multiple forms, of identification (e.g., passport, driver's license, birth certificate, Social Security card, student ID, credit card, debit card, insurance card, etc.). In some situations, a provider institution may require a new customer to provide two or more forms of identification to verify the customer's identity in accordance with the provider institution's CIP. Manually entering the preliminary information and authorizing the account may be time consuming, especially if a large number of customers submit account opening applications at the same time. Further, there may be errors in the paper application that are not discovered until after the event, which may result in a failed account opening attempt (i.e., the account cannot be opened because of the errors in the application). Furthermore, the customer will not be able to immediately access a new account, and instead will need to wait until the agent of the provider institution authorizes the account and completes the account opening at a later time.

According to the present disclosure and as further described herein, a customer or a potential customer may attend a networking event, such as a mixer at a college campus. At the event, an agent or multiple agents of the provider institution may network with customers or potential customers. The agent(s) of the provider institution may assist the customers and/or potential customers (collectively referred to as "customers" herein) open an account with the provider institution. For example, at the mixer, the provider institution hosting the event may provide account application instructions to a potential customer or a group of potential customers. For example, the provider institution may provide the potential customer(s) with a URL or display a code (i.e., a first code), such as a barcode, QR code, etc. By entering the URL code on a computing device or scanning the QR code or barcode, the customer may be directed to a webpage or web application. Via a prompt from the application or webpage, the customer may fill out preliminary account application information (e.g., name of the customer, birthdate of the customer, address of the customer, type of account, identification number, etc.) to open an account. The customer may then submit the partially completed or completed web application to the provider institution. For example, the application can be accessed by the provider institution or a representative of the provider institution, such that the provider institution may confirm the user's identity in accordance with the provider institution's CIP program. The customer may then be instructed (e.g., via a prompt from the application or web page) to present a form, or multiple forms, of identification (e.g., passport, driver's license, birth certificate, Social Security card, student ID, credit card, debit card, insurance card, etc.) to the agent of the provider institution at the event. The agent of the provider institution may then authenticate the form(s) of identification to confirm the customer's identity. For example, the customer may show the agent of the provider institution the customer's preliminary information on the customer's device, and the agent of the provider institution may cross-reference the preliminary information with the information on the customer's form(s) of identification to verify the customer's identity. In response to the identification being authenticated and the customer's identity being verified, the employee may provide the customer with an authentication code (i.e., a second code). The authentication code may be a pre-determined authentication code authorizing an account opening to be completed. For example, after receiving the authentication code from the agent of the provider institution, the customer may enter or otherwise provide the authorization code to/on the web page or application, and the account opening may be completed thereby creating the customer's account. The customer may then access his or her account once the authentication code is received and verified by the provider institution.

This process may reduce or eliminate the need for the agent of the provider institution to access the application from his or her own computing device, thereby reducing the time it takes to complete the account opening. Further, this process may reduce or eliminate the need for the agent of the provider institution to complete the account opening process at a later time.

Referring now to FIG. 1, a block diagram of a digital banker application system 100 is shown, according to an example embodiment. As will be described in further detail below, the digital banker application system 100 provides customers with the ability to open a new account digitally and from a location remote from the a branch location of a provider institution. Further, the digital banker application system 100 may be used to open a new account digitally at a local branch of the provider institution. The technical process and system described herein may be applicable in situations where forms of identification are required to be reviewed/verified by an agent of the operating entity (e.g., gym membership, etc.). As shown, the digital banker application system 100 includes a customer device 104, a provider agent device 254, and a provider institution computing system 106. However, in certain embodiments, the provider agent device 254 may be omitted. The network 108 provides communicable and operative coupling between the customer device 104, the provider agent device 254, the provider institution computing system 106, and/or other components disclosed and described herein to provide and facilitate the exchange of communications (e.g., data, instructions, messages, values, commands, etc.). The network 108 may include one or more of a local area network, a wide area, a wired network, or a combination of wireless and wired networks. Examples of network configurations include the Internet, a cellular network, Wi-Fi, Wi-Max, a proprietary banking network, etc. In some embodiments, the network 108 includes a proprietary banking network to provide secure or substantially secure communications.

The digital banker application system 100 is shown to include a customer device 104 and a provider agent device 254. The customer device 104 and the provider agent device 254 can be any type of computing device associated with a customer and an agent (e.g., an employee and/or representative) of a provider institution, respectively. The customer associated with the customer device 104 may be an individual that has an account (e.g., savings account, checking account, etc.) with a provider institution or an individual that does not have an account with a provider institution. In some embodiments, the customer may be interested in opening an account (e.g., savings account, checking account, etc.) with a provider institution. The agent of the provider institution associated with the provider agent device 254 may be an individual, such as a banker, that assists customers setting up new accounts with the provider institution (e.g., a branch banker, a branch manager, provider institution representative, etc.). The customer device 104 and the provider agent device 254 can include any type of computing device that may be used to create, access, and/or modify account information of accounts relating to the customer. In this regard, the customer device 104 and the provider agent device 254 may include any wearable or non-wearable device. Wearable devices refer to any type of device that an individual wears including, but not limited to, a watch (e.g., a smart watch), glasses (e.g., eyeglasses, sunglasses, smart glasses, etc.), bracelet (e.g., a smart bracelet), etc. The customer device 104 and the provider agent device 254 may also include any type of computing device including, but not limited to, a phone (e.g., smartphone), a tablet, a laptop, a desktop computer, a personal digital assistant, etc. The customer device 104 and the provider agent device 254 may include the same computing devices (e.g., the customer device 104 is a tablet and the provider agent device 254 is a tablet). Alternatively, the customer device 104 and the provider agent device 254 may include different computing devices (e.g., the customer device 104 is a phone and the provider agent device 254 is a laptop).

In some embodiments, the customer utilizes the customer device 104 to receive or capture a first code, send preliminary account application information, and send a second code to the provider institution computing system 106. In some embodiments, the customer utilizes the customer device 104 to receive account application instructions, receive authentication instructions, complete an account application, and access account information that is stored and/or otherwise managed by the provider institution computing system 106.

As shown in FIG. 1, the customer device 104 can include a network interface circuit 124 enabling the customer device 104 to exchange information over the network 108, a processing circuit 126, and an input/output (I/O) device 136. The network interface circuit 124 can include program logic that facilitates connection of the customer device 104 to the network 108. The network interface circuit 124 can support communication between the customer device 104 and other systems. For example, the network interface circuit 124 can include a cellular modem, a Bluetooth transceiver, a Bluetooth beacon, a radio-frequency identification (RFID) transceiver, and a near-field communication (NFC) transmitter. In some embodiments, the network interface circuit 124 includes the hardware and machine-readable media sufficient to support communication over multiple channels of data communication. Further, in some embodiments, the network interface circuit 124 includes cryptography capabilities to establish a secure or relatively secure communication session between the customer device 104 and provider institution computing system 106. In this regard, information (e.g., account information, login information, financial data, and/or other types of data) may be encrypted and transmitted to prevent or substantially reduce the threat of hacking.

The processing circuit 126 is shown to include a processor 128 and a memory 130. The processor 128 may be implemented as one or more application-specific integrated circuits (ASICs), field-programmable gate arrays (FPGAs), a group of processing components, or other suitable electronic processing components. The memory 130 may be one or more devices (e.g., RAM, ROM, Flash memory, hard disk storage) for storing data and/or computer code for completing and/or facilitating the various processes described herein. The memory 130 may be or include non-transient volatile memory, non-volatile memory, and non-transitory computer storage media. The memory 130 may include database components, object code components, script components, or any other type of information structure for supporting the various activities and information structures described herein. The memory 130 may be communicably coupled to the processor 128 and include computer code or instructions for executing one or more processes described herein.

The customer device 104 is shown to include a client application 132. The client application 132 is configured to facilitate management of customer accounts on the customer device 104 and allow the first customer to interact with the customer's accounts. In some embodiments, the client application 132 is structured to provide displays to the customer device 104 (e.g., to the I/O device 136 described below) that enable the customer to view and/or manage customer accounts. Accordingly, the client application 132 can be configured to send information to, and receive information from, the provider institution computing system 106. In some embodiments, the client application 132 may be an application (e.g., a mobile banking application, a social media application, a mobile wallet application, etc.) for the customer to interact with. The client application 132 may couple to a website via the network. The client application 132 may include a mobile banking application and/or a web browser. For example, the client application 132 may be a mobile banking application or other provider institution application or a web browser application.

In some embodiments, the client application 132 may be incorporated with an existing application in use by the provider institution computing system 106 (e.g., a mobile banking application, a service provider application, etc.). In other embodiments, the client application 132 is a separate software application implemented on the customer device 104. The client application 132 may be downloaded by the customer device 104 prior to its usage, hard coded into the memory 130 of the customer device 104, or be a network-based or web-based interface application such that the customer device 104 may provide a web browser to access the application, which may be executed remotely from the customer device 104. Accordingly, the customer device 104 may include software and/or hardware capable of implementing a network-based or web-based application. For example, in some instances, the client application 132 includes software such as HTML, XML, WML, SGML, PHP (Hypertext Preprocessor), CGI, and like languages.

In the latter instance, the customer (e.g., a customer or potential customer) may have to log onto or access the web-based interface before usage of the application. Further, and in this regard, the client application 132 may be supported by a separate computing system including one or more servers, processors, network interface circuits, etc. that transmit applications for use to the customer device 104.

In certain embodiments, the client application 132 includes an application programming interface (API) and/or a software development kit (SDK) that facilitate the integration of other applications with the client application 132. For example, in some embodiments, the client application 132 is configured to utilize the functionality of the provider institution computing system 106 through an API.

The client application 132 enables a customer to send account information and access account information tied to customer accounts associated with the customer. As described above, the client application 132 can be provided as an application on the customer device 104. For example, the client application 132 may be implemented as a banking application associated with a provider institution (e.g., that operates the provider institution computing system 106) and allows the customer to access a checking account, a savings account, loan/mortgage information, etc. In some embodiments, the client application 132 constitutes a web browser hard-coded into the memory 130 and includes executable instructions that allow the customer device 104 to communicate with various systems (e.g., the provider institution computing system 106) via a communications protocol (e.g., the HTTP protocol).

In some embodiments, the customer interacts with the client application 132 via an I/O device 136. The I/O device 136 can include hardware and associated logics that enable the customer to exchange information with the customer device 104. An input component of the I/O device 136 can allow the customer to provide information to the customer device 104. The input component may include various hardware and associated logics such as, for example, a mechanical keyboard, a mechanical mouse, a touchscreen, a microphone, a camera, a fingerprint scanner, etc. Likewise, an output component of I/O device 136 can include hardware and associated logics that allow the customer device 104 to provide information to the customer. For example, the output component may include a digital display, a speaker, illuminating icons, LEDs, etc. In this way, the customer can interact with the client application 132. For example, the customer may provide login information (e.g., customer name, password, etc.) by typing on a mechanical keyboard or touchscreen keyboard included in the I/O device 136 and be provided account information on a digital display component of the I/O device 136.

As shown in FIG. 1, the provider agent device 254 can include a network interface circuit 224 enabling the provider agent device 254 to exchange information over the network 108, a processing circuit 226, and an input/output (I/O) device 236. The network interface circuit 224 can include program logic that facilitates connection of the provider agent device 254 to the network 108. The network interface circuit 224 can support communication between the provider agent device 254 and other systems such as the provider institution computing system 106 and the customer device 104. For example, the network interface circuit 224 can include a cellular modem, a Bluetooth transceiver, a Bluetooth beacon, a radio-frequency identification (RFID) transceiver, and a near-field communication (NFC) transmitter. In some embodiments, the network interface circuit 224 includes the hardware and machine-readable media sufficient to support communication over multiple channels of data communication. Further, in some embodiments, the network interface circuit 224 includes cryptography capabilities to establish a secure or relatively secure communication session between the provider agent device 254 and the provider institution computing system 106. In this regard, information (e.g., account information, login information, financial data, and/or other types of data) may be encrypted and transmitted to prevent or substantially prevent a threat of hacking.

The processing circuit 226 is shown to include a processor 228 and a memory 230. The processor 228 may be implemented as one or more application-specific integrated circuits (ASICs), field-programmable gate arrays (FPGAs), a group of processing components, or other suitable electronic processing components. The memory 230 may be one or more devices (e.g., RAM, ROM, Flash memory, hard disk storage) for storing data and/or computer code for completing and/or facilitating the various processes described herein. The memory 230 may be or include non-transient volatile memory, non-volatile memory, and non-transitory computer storage media. The memory 230 may include database components, object code components, script components, or any other type of information structure for supporting the various activities and information structures described herein. The memory 230 may be communicably coupled to the processor 228 and include computer code or instructions for executing one or more processes described herein.

The provider agent device 254 is shown to include a provider application 232. The provider application 232 is configured to facilitate management of customer accounts by an agent of the provider institution of a provider institution. In some embodiments, the provider application 232 is structured to provide displays to the provider agent device 254 (e.g., to the I/O device 236 described below) that enable the agent of the provider institution to view and/or manage customer accounts. Accordingly, the provider application 232 can be configured to send information to and receive information from the provider institution computing system 106. In some embodiments, the provider application 232 may provide an application (e.g., a mobile banking application, a social media application, a mobile wallet application, an account management application, etc.) for the agent of the provider institution to interact with various customers and the accounts associated with the customers.

In some embodiments, the provider application 232 may be incorporated with an existing application in use by the provider institution computing system 106 (e.g., a service provider application, etc.). In other embodiments, the provider application 232 is a separate software application implemented on the provider institution computing system 106. The provider application 232 may be downloaded by the provider institution computing system 106 prior to its usage, hard coded into the memory 230 of the provider institution computing system 106, or be a network-based or web-based interface application such that the provider institution computing system 106 may provide a web browser to access the application, which may be executed remotely from the provider institution computing system 106. Accordingly, the provider institution computing system 106 may include software and/or hardware capable of implementing a network-based or web-based application. For example, in some instances, the provider application 232 includes software such as HTML, XML, WML, SGML, PHP (Hypertext Preprocessor), CGI, and like languages.

In the latter instance, the agent (e.g., an employee of the provider institution) may have to log onto or access the web-based interface before usage of the application. Further, and in this regard, the provider application 232 may be supported by a separate computing system including one or more servers, processors, network interface circuits, etc. that transmit applications for use to the provider institution computing system 106.

In certain embodiments, the provider application 232 includes an application programming interface (API) and/or a software development kit (SDK) that facilitate the integration of other applications with the provider application 232. For example, in some embodiments, the provider application 232 is configured to utilize the functionality of the provider institution computing system 106 through an API.

The provider application 232 can allow an agent (e.g., an agent of the provider institution) of the provider institution to access account information tied to customer accounts associated with the various customer. As described above, the provider application 232 can be implemented as an application on the provider agent device 254. For example, the provider application 232 may be implemented as a banking application associated with a provider institution (e.g., that operates the provider institution computing system 106) and allows the agent of the provider institution to access information associate with various customers, such as checking accounts, savings accounts, loan/mortgage information, credit scores, etc. The provider application 232 may be implemented as an entity application associated with the entity (e.g., that operates the) and allows the agent of the provider institution to access accounts associated with various customers such as checking accounts, savings accounts, etc. In some embodiments, the provider application 232 constitutes a web browser hard-coded into the memory 230 and includes executable instructions that allow the provider agent device 254 to communicate with various systems (e.g., the provider institution computing system 106) via a communications protocol (e.g., the HTTP protocol).

In some embodiments, the agent of the provider institution interacts with the provider application 232 via an I/O device 236. The I/O device 236 can include hardware and associated logics that enable the agent of the provider institution to exchange information with the provider agent device 254. An input component of the I/O device 236 can allow the agent of the provider institution to provide information to the provider agent device 254. The input component may include various hardware and associated logics such as, for example, a mechanical keyboard, a mechanical mouse, a touchscreen, a microphone, a camera, a fingerprint scanner, etc. Likewise, an output component of I/O device 236 can include hardware and associated logics that allow the provider agent device 254 to provide information to the agent of the provider institution. For example, the output component may include a digital display, a speaker, illuminating icons, LEDs, etc. In this way, the agent of the provider institution can interact with the provider application 232. For example, the agent of the provider institution may provide login information (e.g., customer name, password, etc.) by typing on a mechanical keyboard of the I/O device 236 and be provided account information on a digital display component of the I/O device 236.

As shown in FIG. 1, digital banker application system 100 includes a provider institution computing system 106. In some embodiments, digital banker application system 100 includes multiple provider institution computing system 106s 106. The provider institution computing system 106 is associated with a provider institution (e.g., a financial institution such as a bank, credit union, credit card company, or another entity) and is operated and maintained by the provider institution.

The provider institution computing system 106 is shown to include a network interface circuit 138 and a processing circuit 140. As shown, the provider institution computing system 106 a processing circuit 140 and a network interface circuit 138 enabling the provider institution computing system 106 to exchange information over the network 108. In some embodiments, the network interface circuit 138 and the processing circuit 140 are similar to and/or the same as the network interface circuit 124 and the processing circuit 126 of the customer device 104, respectively. The network interface circuit 138 can include program logic that facilitates connection of the provider institution computing system 106 to the network 108. The network interface circuit 138 can support communication between the other provider institution computing systems 106 and other systems, such as the customer device 104, the provider agent device 254, and/or any third-party computing systems. For example, the network interface circuit 138 can include a cellular modem, a Bluetooth transceiver, a Bluetooth beacon, a radio-frequency identification (RFID) transceiver, and a near-field communication (NFC) transmitter. In some embodiments, the network interface circuit 138 includes the hardware and machine-readable media sufficient to support communication over multiple channels of data communication. Further, in some embodiments, the network interface circuit 138 includes cryptography capabilities to establish a secure or relatively secure communication session between other systems such as the customer device 104, the provider agent device 254, and/or any third-party computing system. In this regard, information (e.g., account information, login information, financial data, and/or other types of data) may be encrypted and transmitted to prevent or substantially prevent a threat of hacking.

The processing circuit 140 is shown to include a processor 114 and a memory 116. The processor 114 may be implemented as one or more application-specific integrated circuits (ASICs), field-programmable gate arrays (FPGAs), a group of processing components, or other suitable electronic processing components. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicably coupled to the processor 114 and include computer code or instructions for executing one or more processes described herein. In some embodiments, the provider institution computing system 106 is a distributed computing system. In this case, provider institution computing system 106 may include multiple network interface circuits 138 and/or multiple processing circuits 140.

The provider institution computing system 106 is shown to include a memory 144 that is shown to include an account database 146. In some embodiments, the processing circuit 140 can allow the provider institution computing system 106 to access and provide information stored in the account database 146. The account database 146 (and thereby the provider institution computing system 106) can operate as a source of data for account information in the digital banker application system 100. In general, the account database 146 can store data associated with customers and can retrieve said data in response to querying initiated by the processing circuit 140. In this way, if the provider agent device 254 and/or the customer device 104 institution requests account information from the provider institution computing system 106 that is stored in the account database 148, the processing circuit 140 can process the request to retrieve the information from the account database 148 and provide the information back (e.g., via the network 108).

Figure 2:
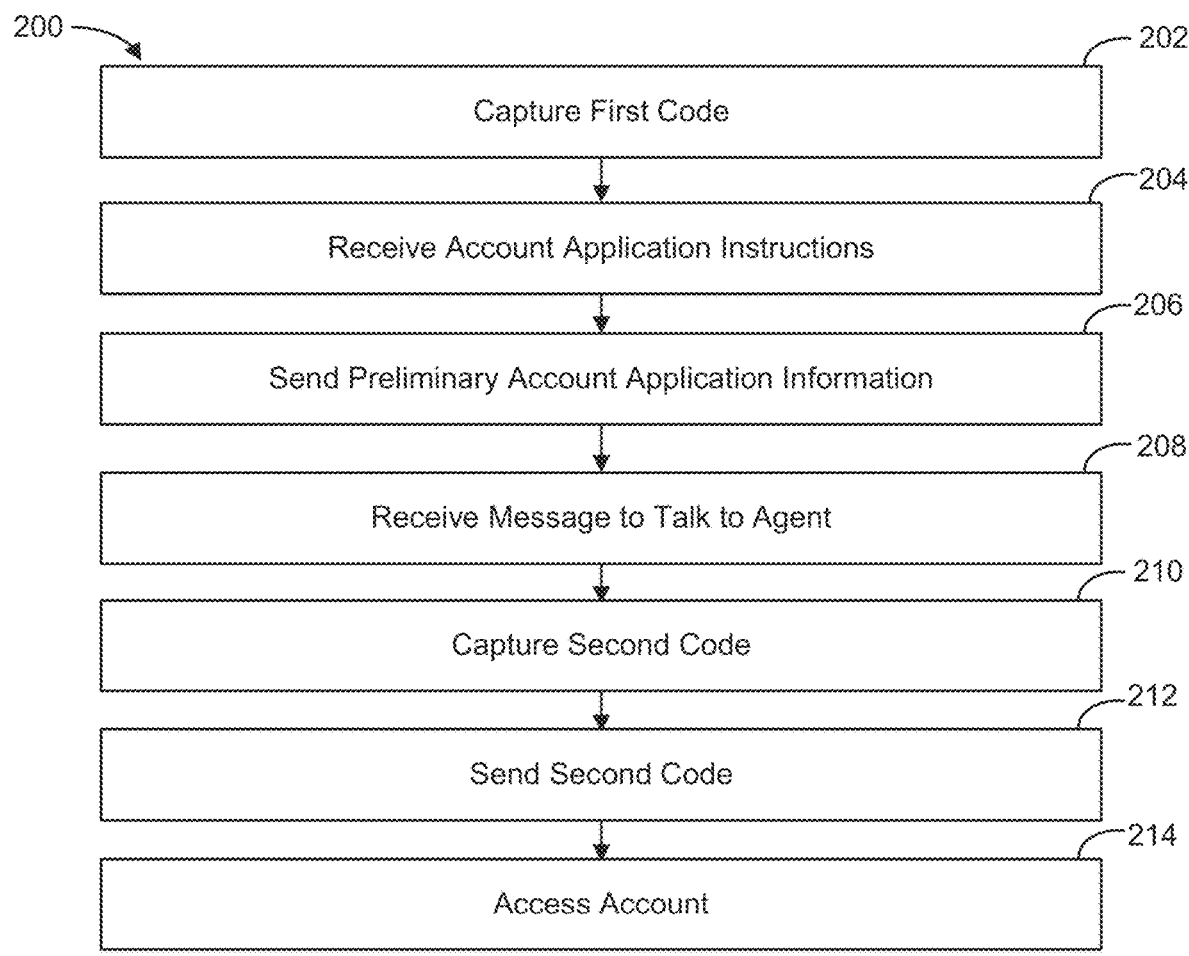
FIG. 2 is a flow diagram of an account opening process, according to an example embodiment.

Referring now to FIG. 2, a flow diagram of an account opening process 200 is shown according to an example embodiment. It should be appreciated the account opening process 200 may be performed in any order and that certain processes may be omitted. Reference may be made to the system and components of FIG. 1 to aid explanation of process 200.

At process 202, a first code is captured. For example, the first code may be captured by the customer device 104. In certain embodiments, account application instructions may be received by the customer device 104 in response to the first code being capture. The account application instructions may instruct or otherwise prompt the customer regarding how complete an account application. The account application instructions may be received from the provider institution computing system 106 and/or the provider agent device 254, as will be discussed in further detail below with respect to process 204. In one embodiment, account application instructions may be provided to a customer in conjunction with the first code. The account application instructions may instruct the customer how to use/access the first code to open an account.

For example, the agent of the provider institution may display written account application instructions on a poster, brochure, presentation, handout, digital display, etc. For example, the agent of the provider institution may display a poster at an account opening event. The poster may include the first code that is capable of being captured by a customer device 104 along with account application instructions that instruct the customer how to use/access the code to open an account. In one example embodiment, the account application instructions may instruct the customer to download an application (e.g., the client application 132). For example, the customer may utilize a camera, which may be accessible by the client application 132, on the customer device 104 to scan a QR code on the poster.

In another example, the account application instructions may instruct the customer to use an image capture device (e.g., a camera) on the customer device 104 to capture the first code. When the customer device 104 captures or scans the first code, a browser or a corresponding application (e.g., the client application 132) may be launched on the customer device 104. The first code may be embedded with code to cause launching or activation of the client application 132, which may be a specific application (e.g., a mobile banking application) or a web browser application. Alternatively, the first code may be a URL that, when entered into the customer device 104 launches a browser. The browser may display a website with additional account application instructions. Further, the browser may direct a customer to download an application (e.g., the client application 132 when it is embodied as a specific application and not the web browser) on the customer device 104.

In some embodiments, the first code may be a scannable code, such as a bar code, a QR code, a PDF417, Code 39, and a Codabar. For example, the customer device 104 may be used to scan the first code. In other embodiments, the first code may be a URL that can be captured by the customer device 104. For example, a customer may use the I/O device 136 to enter the URL into the customer device 104. Alternatively, the customer device 104 may be used to scan the URL. In other embodiments, the first code may be a sequence of alphanumeric characters that may be captured by the customer device 104. For example, a customer may use the I/O device 136 of the customer device 104 to enter the alphanumeric characters into the customer device 104. Alternatively, the customer device 104 may be used to scan the alphanumeric characters.

In some embodiments, the first code may be provided to a customer via a visual medium. For example, an agent of the provider institution may display the first code on a poster, brochure, presentation, handout, digital display, etc. Further, the first code may be generally displayed to members of the public. For example, the first code (e.g., a web address, application name, barcode, etc.) may be displayed on a poster, billboard, or other visual advertisement in public. A poster or digital display that includes the first code may also be displayed inside a local branch of the provider institution. In some embodiments, an agent of the provider institution may display a poster at a mixer. In some embodiments, the first code may be provided to the customer via an audio medium. For example, the agent of the provider institution may verbally read the first code, or otherwise provide the first code, to the first customer. Further, the provider institution may purchase advertisement time on a radio station and/or during a podcast and provide the first code to the customer.

In some embodiments, the first code may be provided to the first customer via a digital medium. For example, the agent of the provider institution may provide the first code to the customer device 104 in an email, text message, iMessage, etc. For example, the agent of the provider institution may email the first code to a group of customers at a mixer event. For example, if the mixer event is at a college campus, the agent may receive a list of students, along with each student's corresponding email address, and the agent may send an email to the group of students that includes account application instructions and/or the first code. In this case and rather than being a scannable, the first code may be configured as a URL. The URL may be unique (i.e., include unique identifiers) for the specific account opening event, as will be discussed further herein. When the customer selects the URL on the customer device 104, the client application 132 (e.g., a mobile banking application, a browser, etc.) may be launched on the customer device 104. For example, the browser may display a website with account application instructions. Further, the browser may direct a customer to download an application on the customer device 104, such as the client application 132. Further, the first code may be captured by the customer device 104 via NFC. For example, the first code may be stored on the provider agent device 254 and sent to the customer device 104 via NFC tap, such that the customer device 104 captures the first code. Using short-range wireless transmission protocols add security to the process and enable the process to be specific to event/limited to reduce bandwidth constraints.

The first code is structured to accelerate the account opening process 200. For example, by capturing the first code, a website or corresponding application (e.g., the client application 132) may be automatically launched on the customer device 104 so that a customer does not need to search for the proper website and/or corresponding application needed to begin an account application. As will be discussed further herein, unique identifiers embedded into the first code may accelerate the account application process because certain account application information may be automatically populated because of the unique identifiers. Further, the first code is structured to add a layer security and traceability. For example, as is discussed further herein, unique identifiers in the first code may identify the agent that is assisting the customer apply for an account. Further, the unique identifiers may be used to while verifying the second code, thereby adding an additional layer of security.

In certain embodiments, the client application 132 (e.g., a browser and/or a corresponding application), may be launched on the customer device 104 in response to the first code being captured. For example, when the first code is captured, a web browser may be launched, and the customer device 104 may be directed to a webpage. The web page may be operated by the provider institution. For example, the web page may be a virtual banking website. Further, an application, such as a mobile application, may be launched on the customer device 104 in response to the first code being captured. For example, a mobile banking application operated by the provider institution (e.g., the client application 132) may be launched on the customer device 104 in response to the first code being captured. Further, a request to download an application may be presented on the customer device 104 in response to the first code being captured on the customer device 104. For example, an application download platform (e.g., the apple app store, the android store, the google app store, etc.) may be launched on the customer device 104 in response to the first code being captured. The customer may then be prompted to download the mobile banking application on the customer device 104. In some embodiments, the customer device may scan a QR code, which may launch an application download platform, which may prompt the customer to download a mobile banking application on the customer device 104, and once downloaded, the mobile banking application may be launched.

In some embodiments, process 202 may include identifying the location of the customer device 104. The customer device 104 may use a GPS, or other location identification method, to determine the location of the customer device 104. For example, the customer device 104 may use a GPS, or other location identification method, to identify the mixer event as well as the location or approximate location of the customer device 104. In some embodiments, the location of the customer device 104 may be used in conjunction with stored location information regarding the mixer. For example, when the customer device 10 is within a predefined range of a mixer, a prompt may be sent to the customer device 104 to capture the first code. Alternatively, the first code may be transmitted as a push notification to the customer device 104. In some embodiments, the first code may be transmitted as a push notification to a customer device 104 that is operated by a customer that is an existing customer with the provider institution such that the provider institution may provide the customer device 104 with additional products and/or services.

In certain embodiments, the first code may include unique identifiers. For example, the location, date, and/or time of an event may be embedded as unique identifiers within the first code. Further, the identity of an agent of the provider institution may be included as a unique identifier in the first code. In some embodiments, the customer may not be aware that this information is embedded within the first code. The unique identifiers may be used later in the account opening process 200. For example, when the second code is received by the provider institution computing system 106 from the customer device 104 (see process 214 below), the second code may include unique identifiers that may be compared to the unique identifiers in the first code as an added layer of security, as will be discussed further herein. Further, the unique identifier may be used to automatically generate preliminary account application information, as will be discussed further with respect to process 204 and process 206. Further, when the first code is captured by the customer device 104, the customer device 104 may use a GPS or other location identification method to determine a position of the customer device 104, and the location of the customer device 104 may be used as a unique identifier. The unique identifiers may be used later in the account opening process 200, as will be discussed further herein.

At process 204, account application instructions may be received. For example, account application instructions may be received by the customer device 104. In certain embodiments, account application instructions may be received by the customer device 104 in response to the first code being captured. For example, the account application instructions may be received from the provider institution computing system 106 and/or the provider agent device 254. The account application instructions may provide an indication of the information needed by a customer to complete the account application. As discussed above, the account application instructions may be provided to the customer before the first code is captured. In this example embodiment, the account application instructions may instruct the customer how to use/access the first code to open an account. Further, as discussed above, the account application instructions may be provided to the customer in conjunction with the first code. In this example embodiment, the account application instructions may instruct the customer how to use/access the first code to open an account.

The account opening instructions may be received by the customer device 104. For example, if a webpage or application (e.g., the client application 132) is launched in response to the first code being captured, the webpage or application may display account application instructions. In some embodiments, a graphical user interface (GUI) may be displayed on the customer device 104 in response to the first code being captured. The GUI may include account application instructions, such as the GUI shown in FIGS. 4 and 5, which are discussed further below. The account application instructions may include information such as the forms of identification that may be needed to open a new account, login information needed to create an account on the webpage or application, and a prompt that instructs the customer to fill in preliminary account application instructions within the webpage or application (see FIG. 5).

The account application instructions received by the customer, or group of customers, may include instructions to begin providing answers to questions needed to open a new account. For example, after the webpage or application (e.g., the client application 132) is launched on the customer device 104, the webpage or application may display via the I/O device 136 instructions for filling out preliminary account application information (e.g., name, address, type of account the customer would like to open, etc.) needed to open a new account with the provider institution.

In some embodiments, some of the preliminary account application information may be automatically filled in, at least partly, on behalf of the customer. For example, if the first code includes unique identifiers, certain preliminary account application information may be filled in for the customer automatically using the unique identifiers (i.e., one or more fields of the GUI may be pre-populated with information specific to the first code). For example, if the first code if the first code includes a unique identifier that identifies the location of a local branch, the location of the local branch may be automatically filled in for the customer in the preliminary account information. Similarly, if the first code is displayed at a mixer, the location of the nearest local branch may be automatically filled in. The customer may then use the I/O device 136 of the customer device 104 to complete the remainder of the preliminary account application information, as will be discussed below. Alternatively, or additionally, the customer may use the customer device 104 to upload a photograph or multiple photographs of a physical form of identification to the webpage or application (e.g., the client application 132). These photographs may then be scanned and preliminary account application information may be pulled from the physical form of identification. This information may then be used to automatically fill part or all of the preliminary account application information as will be discussed below.

Process 206 includes sending preliminary account application information (i.e., customer information). For example, the customer device 104 may send preliminary account application information to the provider institution computing system 106 and/or the provider agent device 254. The preliminary account application information may include information requested as a part of the account application instructions. The preliminary account application information may include information needed to open an account with the provider institution. For example, the preliminary account application information may include information required by the provider institution's CIP.

The preliminary account information may include information about the applicant (i.e., the customer) that is needed to open an account with the provider institution. Some or all of the preliminary information may also be required by the provider institution's CIP. For example, the preliminary information may include the customer's first name, middle name, last name, date of birth, address, city, state, and zip code. The preliminary account information may also include information about a form of identification the customer may wish to use to verify the customer's identity. For example, the preliminary account information may include the type of identification (e.g., passport, driver's license, birth certificate, student ID, credit card, debit card, insurance card, etc.) and the identification number (e.g., driver's license number, passport number, etc.).

The preliminary account information may also include a picture of a form, or multiple forms, of identification that the customer may use to verify the customer's identity. For example, the customer may take a picture of the front and back of his or her driver's license using the camera on the customer device 104. The customer may then send these pictures, along with the other preliminary account application information to the provider institution. The preliminary account information may also include a preferred local branch that the customer would like to select as the customer's branch. This information may be determined at least in part based on unique identifiers that are included in the first code or determined when the first code is captured. For example the first code may include a unique identifier that identifies the closest local branch, and this branch may be suggested or selected as the customer's preferred local branch.

In certain embodiments, the customer device 104 may be used to take a picture of a form of identification that identifies the customer. Once the picture is scanned, the provider application may convert the information on the form of identification to digital data and the preliminary account information may be automatically populated into a preliminary account information field within the financial application, as will be discussed further with respect to FIGS. 6 and 7.

In some embodiments, once the preliminary account application information is received (e.g., by the provider institution computing system 106), the provider institution may perform a risk assessment. That is, the provider institution may analyze the account application response and determine whether additional processes are needed to verify the customer's identity. For example, the provider institution or entity may cross-reference information submitted by the customer in the account application response with other information available to the provider institution (e.g., information from a separate account with the provider institution, information provided by a consumer credit reporting agency, scraped information from a social media site(s), etc.) and perform a risk assessment regarding verifying the identity of the customer or other information. In some embodiments, the provider institution may proceed to open a new account for the customer after the risk assessment. For example, if the customer has an extensive credit history or already has an account with the provider institution, and the customer uploads two forms of identification, the bank may determine that no further processes need to be taken to verify the customer's identity. If the provider institution's risk assessment determines that the customer has complied with the provider institution's CIP, the process may skip to process 214. However, for example, if the customer does not have an extensive credit history and does not already have an account with the provider institution, the provider institution's CIP may require the provider institution to take further processes to verify the customer's identity, as will be discussed further herein.

Figure 13:
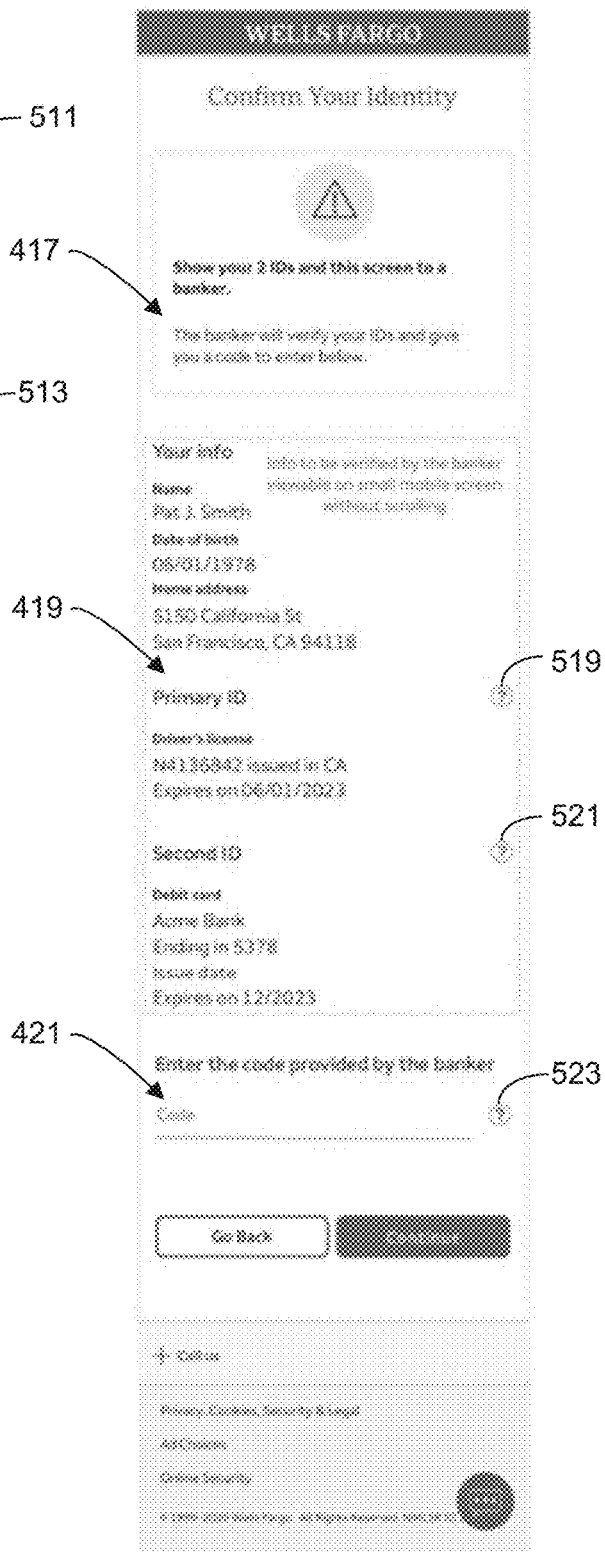
FIG. 13 is another GUI for confirming a customer's identity, according to an example embodiment.

In certain embodiments, part of the risk assessment may include providing a contact confirmation code to the customer device 104. It should be appreciated that the contact confirmation code may be different from the first code and the second code. For example, the contact confirmation code may be sent by the provider institution computing system 106 and/or the provider agent device 254. In some embodiments, the contact confirmation code may be used to confirm the phone number provided by the customer in the primary account application information. For example, a unique alphanumeric code may be sent as a text message to the phone number provided by the customer in the primary account application information. In some embodiments, the phone number may be associated with the customer device 104. The customer may then be prompted to enter the alphanumeric code into the webpage or application (e.g., the client application 132) as shown in FIG. 13 below.

In certain embodiments, process 206 may also include using the customer device 104 to take a selfie (i.e., a photograph of the customer using the customer device 104). For example, the customer may be prompted to take a photograph of the customer's face using the customer device 104. The selfie taken by the customer may then be included in the preliminary account application information. In certain embodiments, as an additional safety measure, facial recognition software may be used to confirm that the face captured in the selfie matches the face on the form(s) of identification uploaded on the customer device 104. The selfie may further be used to authenticate the identity of the customer. For example, the selfie may be used at process 308 as is discussed further herein.

Process 208 includes receiving a message to confer with an agent. For example, the message to confer with the agent may be received by the customer device 104. The message to confer with the agent may be sent to the customer device 104 by the provider institution computing system 106 and/or the provider agent device 254 in response to receiving the preliminary account application information from the customer device 104. The message (e.g., a push notification, an in-application message, an email, a text message, etc.) to confer with the agent may include instructions to provide identity information to a provider institution agent (e.g., banker). For example, the message to confer with the agent may include directing a customer to present a physical form, or multiple forms, of identification to an agent of the provider institution.

In some embodiments, the message to confer with the agent may be received by the customer via the customer device 104. For example, after a risk assessment is performed, and a determination is made that additional processes need to be taken to verify the customer's identity, a message notification may be displayed on the customer device 104. The message notification may include instructions to see an agent of the provider institution. The message to confer with the agent may then be displayed to the customer via the I/O device 136 of the customer device 104.

The message to confer with the agent may include instructing the customer to verify his or her ID with a banker or representative of the provider institution. The message may instruct the customer to verify his or her ID with the agent or representative in response to sending preliminary account application instructions. In an example embodiment, if the customer is at a local branch of the provider institution, the authentication instructions may include instructing the customer to see an agent at the local branch to verify the customer's ID. In another example embodiment, if the customer is not at a local branch or a mixer, the authentication instructions may include instructing the customer to go to the nearest local branch and verify the customer's ID at the local branch. The customer device 104 may utilize a GPS, or other location identification process, to determine the nearest branch. In this embodiment, a map may be launched within the application (e.g., the client application 132) or webpage and the message may include instructions for driving, biking, walking, and/or taking public transit to travel to the nearest local branch.

Process 210 includes capturing a second code. For example, the second code may be captured by the customer device 104. The second code may be captured by the customer device 104 in response to an agent verifying the identity of the customer. The second code is structured to confirm the identity of the customer based on a verification of identity information from the provider institution agent. Accordingly, the second code may also be referred to as an authentication code herein. The second code may be used to confirm that the customer has verified his or her identity with an agent of the provider institution in compliance with the provider institution's CIP and/or KYC program. By capturing the second code on the customer device 104, the agent may not have to use the provider agent device 254 to confirm that the customer has verified his or her identity with the agent.

In some embodiments, the second code may be a code, such as a bar code, a QR code, a PDF417, Code 39, Codabar, a token that is transmittable via a short range wireless communication (e.g., a NFC token), etc. For example, the customer device 104 may be used to scan and capture the second code. In some embodiments, the second code may be a sequence of alphanumeric characters that may be captured by the customer device 104. For example, a customer may use the I/O device 136 of the customer device 104 to enter the alphanumeric characters into the customer device 104. Alternatively, the customer device 104 may be used to scan and capture the alphanumeric characters.

In some embodiments, the second code may be provided to a customer via a visual medium. For example, an agent of the provider institution may display the second code on paper, handout, digital display, etc. The customer may then use the I/O device 136 of the customer device 104 to enter the second code into the customer device 104 such that the customer device 104 may capture the second code. Further, the provider agent device 254 may display the second code to the customer. For example, the agent may use the provider application 232 to display the second code to the customer. The customer may then use the I/O device 136 of the customer device 104 to enter the second code into the customer device 104 such that the customer device 104 may capture the second code. Alternatively, the customer may use the customer device 104 to scan the second code being displayed on the provider agent device 254. The agent may provide the customer with a barcode printed on a piece of paper or other medium that can be scanned by the customer device 104.

In some embodiments, the second code may be provided to the customer via an audio medium. For example, the agent of the provider institution may verbally read the second code, or otherwise provide the second code, to the first customer. The customer may then use the I/O device 136 of the customer device 104 to enter the second code into the customer device 104 such that the customer device 104 may capture the second code.

In some embodiments, the second code may be provided to the first customer via a digital medium. For example, the agent of the provider institution may provide the second code to the customer device 104 in an email, text message, iMessage, etc. For example, the agent of the provider institution may email the second code to the customer in response to verifying the customer's identity. The second code may then be capture by the customer device 104. Further, the second code may be sent to the customer device 104 using NFC. For example, the customer device 104 may engage in an NFC tap with the provider agent device 254, which may send the second code from the provider agent device 254 (e.g., from the provider application 232) to the customer device 104 (e.g., to the client application 132) in response to agent verifying the customer's identity. Thus, the customer device 104 may capture the second code by NFC tap.

In some embodiments, the second code may include a biometric scan. For example, the customer device 104 may be capable of capturing a biometric scan. For example, the agent may provide a biometric scan on the customer device 104 in response to verifying the customer's identity. The biometric scan may then be a part the second code. Further, the biometric scan may be the second code. For example, at a mixer, the agent may individually provide a biometric scan on each customer device 104 in response to individually verifying each customer's identity.

In some embodiments, the second code may be generated before the customer's identity is verified by agent (i.e., a pre-determined second code). In some embodiments, the second code may be generated before the first code is captured by the customer device 104. For example, if an agent is attending a mixer, the agent may generate multiple second codes before the mixer event as is discussed further below with respect to FIGS. 3 and 14. By generating many pre-determined second codes, the agent does not need to generate a new second code after every customer's identity that has been verified, thereby accelerating the account application process.

In some embodiments, the second code may be generated after the first code is captured by the customer device 104 (i.e., a customer specific second code). For example, the account application authentication code may be an authentication code dynamically generated in real time via the provider agent device 254 (e.g., generated using the provider application 232). For example, the second code may be generated after the agent has verified the customer's identity, as will be discussed further below with respect to FIGS. 3 and 14.

In some embodiments, generating the second code may require the agent of the provider institution to securely log into the provider application 232 on the provider agent device 254. For example, the second code may be generated in response to the agent of the provider institution successfully logging into the provider agent device 254 using a secure login. Alternatively, or additionally, the provider agent device 254 may have a biometric reader (e.g., fingerprint scanner, eye scanner, facial recognition, voice recognition, etc.) that the agent of the provider institution may use to securely log into the provider agent device 254. For example, the second code may be generated in response to provider agent device 254 successfully taking a biometric reading of the agent of the provider institution.

In some embodiments, the second code includes unique identifiers. When generating the second code, the agent may enter in code generation parameters, which may be included as unique identifiers in the second code. For example, the location, date, and/or time of a mixer event may be embedded as unique identifiers within the second code. Further, the identity of an agent of the provider institution may be included as a unique identifier in the second code. Further, the location of a local branch of the provider institution may be included as a unique identifier in the second code. These unique identifiers may be embedded into the second code regardless of whether the second code is pre-determined or customer specific. In some embodiments, the customer may not be aware that this information is embedded within the second code. The unique identifiers in the second code may be similar to the unique identifiers in the first code.

In some embodiments, the second code may include customer specific unique identifiers. For example, if the second code is generated in response to the agent verifying the customer's identity, the agent may enter in customer specific information (i.e., code generation parameters) when generating the second code. For example, the agent may enter the name, initials, address, birthday, or any other identifying information that is representative of the customer that presents an ID for authentication as code generation parameters when generating the second code. This information may be entered into the provider agent device 254 when generating the second code. In this embodiment, the second code is specific to each customer. A carbon copy of this second code may be sent to the provider computing system after it is sent as well to the customer device 104. That way, the provider computing system may confirm the second code when it is received from the customer device 104.

In some embodiments, unique identifiers in the second code may be used for added security. For example, if the agent enters "Jane Doe" as the name of the customer and "May 28, 1993" as the birthday as code generations parameters, the authentication code may only be accepted by the provider institution for a customer named Jane Doe born on May 28, 1993, as indicated by the preliminary application information submitted at process 204. Further, the second code may include unique identifiers that may be compared to the unique identifiers of the first code. For example, if the first code received by customer device 104 includes a unique identifier that identifies the mixer that the customer is at (e.g., the location, time, date, agent at the mixer, etc.), then the second code may only be accepted by the provider institution computing system 106 if the unique identifiers in the second code align with the unique identifiers in first code.

In some embodiments, the second code may include restrictive parameters. For example, the authentication code may include a restrictive parameter that requires the authentication code to be provided within a certain time frame (e.g., within 24 hours of being created). Further, the second code may be embedded with a restrictive parameter (e.g., a time expiration period parameter) that requires the second code to be received within a predefined amount of time of the first code, and if the second code is not received with a predefined amount of time of the first code, the second code is not validated.

The authentication code may include a restriction requirement that the authentication code may only be used in conjunction with a specific event. For example, when account application instructions are received at process 202, the account application instructions may include instructing the customers at the event to enter in the location and/or event that they are at when beginning the account opening process 200. Further, the customer device 104 may use a GPS or other location identification method to determine the location of the customer device. This location may then be compared to a restrictive parameter that restricts what location the second code may be used at. Additionally, if the customer captures the first code by scanning a barcode, the location and/or specific mixer may be built into the barcode (e.g., as unique identifiers), and therefore automatically recognized by the customer device 104 when the barcode is scanned. In this example embodiment, the second code may include restrictive parameters that only allow the authentication codes to be successfully submitted by customers that scanned the barcode at the mixer, are at the mixer (e.g., the GPS of the customer device 104 indicates that the customer device 104 is within a specified geographic perimeter), and/or the customer indicated that they are at a specific mixer when the customer submitted the preliminary account application information. Further, the second code may include a restrictive parameter that the second code may only be used once, and any subsequent attempt to use the second code may be unsuccessful. The second code may include the above listed restrictive parameters and any other restrictive parameter.

Process 212 includes sending the second code. For example, the account application authentication code may be sent by the customer device 104 to the provider institution computing system 106. The second code may then be verified by the provider institution computing system 106, which may eliminate the need for the agent to verify the customer's account application on the provider agent device 254.

In some embodiments, the second code may be automatically sent by the customer device 104. For example, once the customer has entered the second code into the customer device 104, the second code may be automatically sent to the provider institution computing system 106. Further, if the customer uses the customer device 104 to scan a second code (e.g., a barcode), the application (e.g., the client application 132) or webpage may automatically send the second code in response to scanning the second code. Similarly, if the second code includes the agent providing a biometric scan on the customer device 104 as a second code, the digitized biometric scan may be automatically sent by the customer device 104 once the biometric scan is complete. In other embodiments, the customer may choose to send the second code using the customer device 104.

Once the second code is received by the provider institution computing system 106, the second code is verified. For example, the second code may be verified by confirming that the second code was generated by the provider institution computing system 106 or the provider agent device 254 by comparing the second code received to a list of second codes that have been generated. Further, the second code may be verified by comparing and unique identifiers in the second code to the preliminary account application information, the unique identifiers in the first code, and any other parameters that the unique identifiers may be compared to. Furthermore, the second code may be verified by checking the restrictive parameters built into the second code. An account may be opened in response to verifying the second code.

Process 214 includes accessing the account. For example, the account may be accessed by the customer device 104. The provider institution computing system 106 may receive the second code from the customer device 104 and complete the account opening in response to verifying the account application authentication code. In certain embodiments, an account opening notification may be displayed on the customer device 104 that indicates that the customer has successfully opened an account with the provider institution. In certain embodiments, completing the account opening enables the customer to access a newly opened account with the provider institution using the customer device 104 and/or any other device that may be connected to the network 108. In some embodiments, the account information may be stored in the account database 146 of the provider institution computing system 106. The customer device 104 may be configured to access and/or modify account information stored in the account database 146 of the provider institution computing system 106.

Providing customers with the second code may expedite the account opening process. For example, if the agent of the provider institution provides the customer with a second code, the account may be opened immediately when the pre-determined account application authentication code is received and verified by the provider institution computing system 106. Therefore, the agent of the provider institution does not need to verify and authorized the application on the provider agent device 254 or any other device connected to the network 108. This may reduce the turnaround time required to open a new account, thereby providing customers access to a new account sooner.

Figure 3:
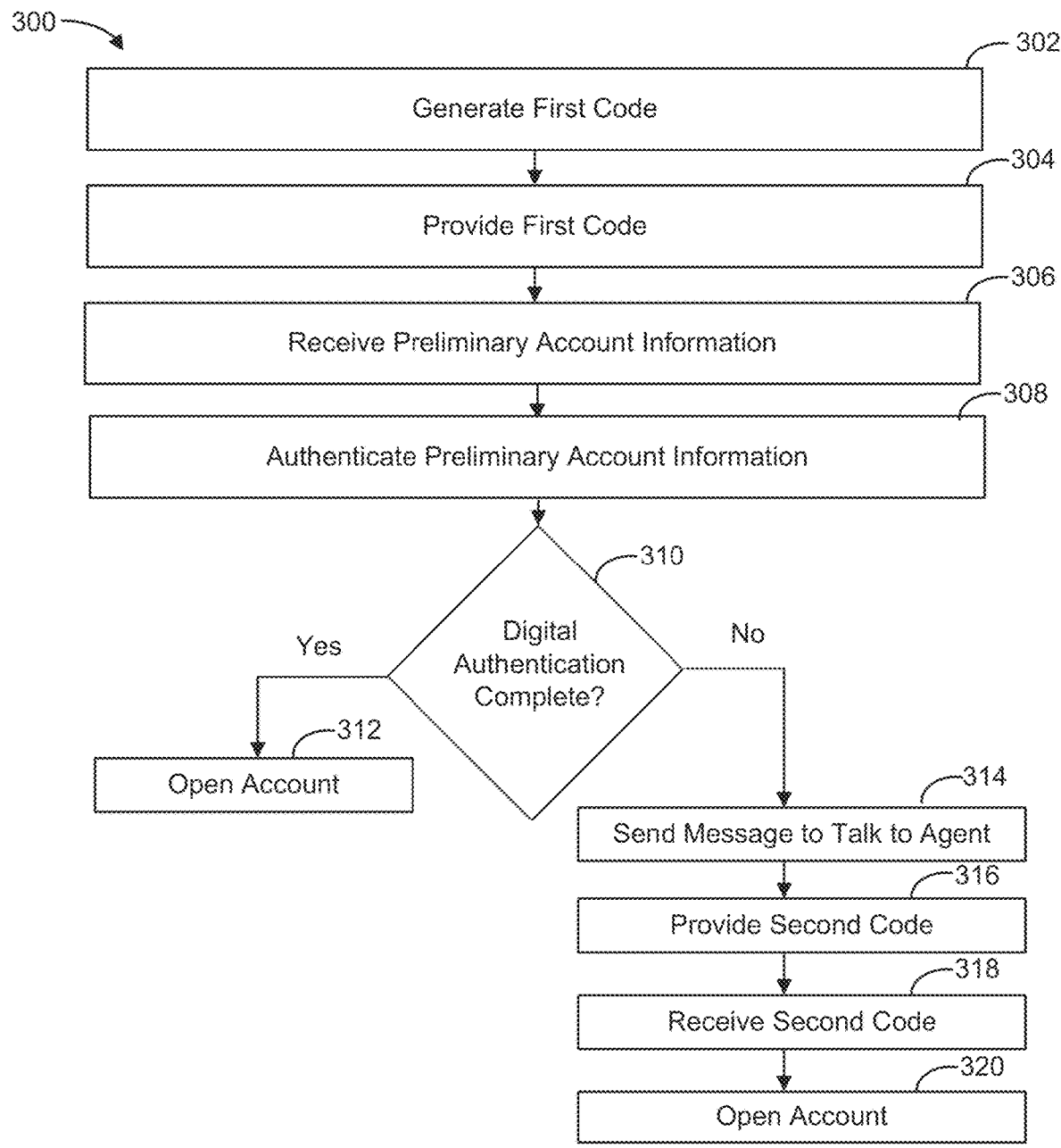
FIG. 3 is a flow diagram of another account opening process, according to an example embodiment.

Referring now to FIG. 3, an account opening process 300 is shown according to an example embodiment. In some embodiments, the account opening process 300 may be performed by the provider institution computing system 106 and/or the provider agent device 254. It should be appreciated the process of the account opening process 300 may be performed in any order and that certain processes may be omitted.

Process 302 includes generating a first code. Generating the first code may be done by the provider institution computing system 106 and/or the provider agent device 254. In some embodiments, the first code may be generated using the provider application 232. In further embodiments, the first code may be generated by a third party and provided to the provider institution for distribution. Process 302 may be similar to process 202. For example, the first code generated at process 302 may be the first code captured at process 202.

Process 304 includes providing the first code. In some embodiments, the first code may be provided to a customer device 104 via the provider institution computing system 106 and/or the provider agent device 254. Process 304 may be similar to process 202 and process 204. For example, the first code may be provided to the customer and/or customer device 104 in a similar manner discussed in process 202 and process 204. Further, process 304 may include providing account application instructions to a customer and/or customer device 104 in a similar manner as described in process 204.

Process 306 includes receiving preliminary account information (i.e., customer information). In some embodiments, the preliminary account information may be received by the provider institution computing system 106 and/or the provider agent device 254. For example, preliminary account information may be sent by a customer device 104 and received by the provider institution computing system 106 and/or the provider agent device 254. Process 306 may be similar to process 206. For example, the preliminary account application information sent at process 206 may be received at process 306.

Process 308 includes authenticating the preliminary account information. For example, the preliminary account information that is received by the provider institution computing system 106 and/or the provider agent device 254 at process 306 may be authenticated by the provider institution computing system 106 and/or the provider agent device 254. As discussed above, authenticating the preliminary account information may include performing a risk assessment. That is, the provider institution or entity may analyze the preliminary account information received at process 306 and determine whether additional processes are needed to verify the customer's identity. For example, the provider institution or entity may cross-reference information submitted by the customer in the account application response with other information available to the provider institution (e.g., information from a separate account with the provider institution, information provided by a consumer credit reporting agency, etc.) and perform a risk assessment regarding verifying the identity of the customer.

In certain embodiments, the preliminary account information includes the customer's preferred local branch. In this embodiment, the preliminary account information may be authenticated according to the local branch's rules (e.g., in accordance with the local branches CIP and/or KYC programs).

Decision 310 includes determining whether or not the digital authentication is complete. For example, decision 310 may be performed by the provider institution computing system 106 and/or the provider agent device 254. As discussed above, in some embodiments, the provider institution computing system 106 may proceed to open a new account for the customer after the risk assessment performed as a part of authenticating the preliminary account information. For example, the provider institution computing system 106 may determine that the requirements of the local branch's CIP and/or KYC program have been satisfied. For example, if the customer has an extensive credit history or already has an account with the provider institution, and the customer uploads two forms of identification, the bank may determine that no further process need to be taken to verify the customer's identity. However, if the customer does not have an extensive credit history and does not already have an account with the provider institution, the provider institution's CIP and/or KYC program may require the provider institution to take further processes to verify the customer's identity, as will be discussed further herein. If the digital authentication is completed, the account opening process 300 may proceed to process 312. If the digital authentication is not complete, the account opening process may proceed to process 314.

Process 312 includes opening an account. For example, the provider institution computing system 106 and/or the provider agent device 254 may open an account in the name of the customer that submitted the preliminary account information. As discussed above, the account may be accessed by the customer device 104. In certain embodiments, process 312 further includes sending a notification to the customer device 104. For example, a notification may be sent by the provider institution computing system 106 and/or the provider agent device 254 to a customer device 104. The notification may indicate that a new account has been successfully opened and that the account may be accessed immediately by the customer. For example, the customer may access the account on a customer device 104.

Process 314 includes sending a message to confer with an agent. For example, a message or notification (i.e., a stop message, stop notification, etc.) may be sent by the provider institution computing system 106 and/or the provider agent device 254 to the customer device 104. As discussed above, the stop notification may include instructions to verify a customer's physical form of identification with an agent. For example, if the customer is at a mixer, the stop notification may instruct the customer to see an agent that is at the mixer to verify the customer's identification. The customer may then verify his or her identity with the agent according to the provider institution's CIP and/or KYC program. It should be appreciated that process 314 may share any or all characteristics with account opening process 200. Specifically, process 314 may include any of all processes described in process 208 described above.

Process 316 includes providing a second code. For example, a second code may be provided to the customer device 104. As discussed above, in some embodiments, the second code may be provided to the customer device 104 by the provider institution computing system 106 and/or the provider agent device 254. Further, the second code may be provided by the agent to the customer in response to the agent verifying the agent's identity. The second code may share some or all characteristics of the second code described with respect to the account opening process 200 above. Further, the second code may be sent (i.e., provided) to the customer any way that is described with respect to the account opening process 200 above. As discussed herein, the second code may be pre-determined or customer specific. Further, the second code may be generated to include unique identifies. Furthermore, the second code may be generated to include restrictive parameters. In some embodiments, the second code may be generated using the provider application 232. In some embodiments, the second code may be generated by a third party and distributed by the provider institution.

Process 318 involves receiving the second code. For example, the second code may be received by the provider institution computing system 106 and/or the provider agent device 254. Process 318 may be similar to process 212. For example, the second code sent at process 212 may be received by at process 318.

Process 320 involves opening an account. For example, the provider institution computing system 106 and/or the provider agent device 254 may open an account after the second code has been verified in the name of the customer that submitted the preliminary account information. Process 320 may be similar to process 312.

Referring now to FIGS. 4-13, multi-feature graphical user interfaces ("GUIs") are shown according to an example embodiment. For example, the GUIs may be displayed on the customer device 104 during the account opening process 200 and/or the account opening process 300. Thus, the GUIs may enable any of the functionality that is described with respect to process 200 and/or process 300. The GUIs may be displayed in the client application 132 (e.g., a browser and/or an application). The GUIs enable the customer to receive account application instructions, enter preliminary account information, receive authentication instructions, enter an account application authentication code, access an account, and any other processes that are described herein.

Figures 4, 5:
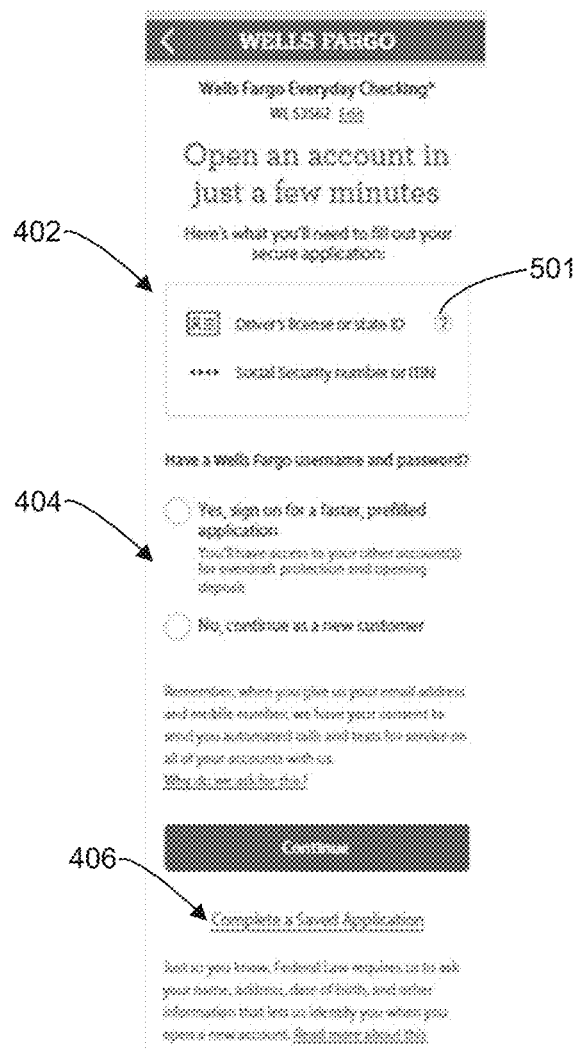
FIG. 4 is a graphical user interface (GUI) for beginning an account opening process, according to an example embodiment.
FIG. 5 is a GUI for inputting preliminary account application information, according to an example embodiment.

Referring now to FIG. 4, a GUI is shown according to an example embodiment. In some example embodiments, this GUI may be displayed on a customer device 104 in response to receiving account application instruction as described with respect to process 202 and/or process 304. For example, if a first code is scanned, a browser may be opened, and the GUI of FIG. 4 may be displayed on the customer device 104. Further, if a URL is entered into the customer device 104, a browser may be opened, and the GUI of FIG. 4 may be displayed on the customer device 104. Furthermore, if a customer device 104 downloads an application (e.g., the client application 132), the GUI of FIG. 4 may be displayed on the customer device 104 when the application is opened.

The GUI of FIG. 4 includes an account application instructions area 402 according to an example embodiment. For example, as shown, the account application instructions area 402 may include a description of the items (e.g., forms of identification) a customer may need to open an account. The required items may vary based on the type of account that the customer wishes to open and any local branch rules that may apply to the customer. Any unique identifiers that are included in the first code (see process 302 above) may be used to customize the account application instructions. For example, if the first code includes a unique identifier that identifies the local branch, the account application instructions area 402 may be updated based on that banks CIP and/or KYC program.

The GUI of FIG. 4 also includes a current customer inquiry area 404. The current customer inquiry area 404 allows the customer to use the customer device 104 to select whether or not the customer already has an account with the provider institution. As discussed above, if the customer already has an account with the provider institution, there may be less processes needed to verify the customer's identity in accordance with the provider institution's CIP and/or KYC programs.

The GUI of FIG. 4 also includes a continue application function 406. If a customer selects the continue application function 406, the customer may continue an application that he or she previously started. For example, a customer may start an application and the partially completed application may be stored on the provider institution computing system 106. The customer may then use the continue application function 406 to access the previously started application and complete the account opening process.

The GUI shown in FIG. 4 also includes a help icon 501. The help icon 501 may be selected to provide more information about the information that is being requested. For example if the help icon 501 is selected, more information may be presented about what the customer may need to start an account (e.g., a driver's license, a state ID, a social security number, and/or an ITIN number).

Referring now to FIG. 5, a GUI is shown according to an example embodiment. In some embodiments, the GUI in FIG. 5 may be displayed on the customer device 104. For example, if the customer uses the GUI to indicate that he or she does not currently have an account with the provider institution, then the GUI of FIG. 5 may be presented. In some example embodiments, the GUI includes a preliminary account information area 408. For example, a customer may enter preliminary account information (e.g., first name, middle initial, last name, id type, id number, expiration date, date of birth, street address, city, state, zip code, etc.) into the preliminary account information area 408 using the customer device 104. In some embodiments, some of the preliminary account information may be automatically populated. For example, if the customer uses the customer device 104 to scan a first code to receive account application information (e.g., process 202), the first code may include unique identifiers. The unique identifiers may be used to automatically populate certain preliminary account application information. For example, if the first code is presented at a mixer, the city, state, and zip code of the mixer may be included as unique identifiers in the first code and may be automatically populated into preliminary account information area 408.

The GUI displayed in FIG. 5 also includes an identification upload option 410. If a customer selects the identification upload option 410, the customer may be prompted to use his or her customer device 104 to upload a picture of physical identification that identifies the customer. For example, if the customer selects the identification upload option 410, the GUI of FIG. 6 may be displayed on the customer device 104.

The GUI displayed in FIG. 5 also includes a first help icon 503 and a second help icon 505. The help icons 503, 505 may be selected to provide more information about the information that is being requested. For example if the first help icon 503 is selected, more information may be presented about the accepted types of identification. For example, a pop-up may be displayed that includes a message that indicates the form of identification must include a photo of the customer or the signature of the customer. The pop-up may also include a list of acceptable forms of identification (e.g., a consular card, a credit card, a debit card, a driver's license, employment authentication card, employer ID, municipal ID, passport, permanent resident card, state ID, student ID, etc.). Further, if the second help icon 505 is selected, more information may displayed about the street address that is requested (e.g., billing address, current residence, business address, etc.).

Figures 6, 7:
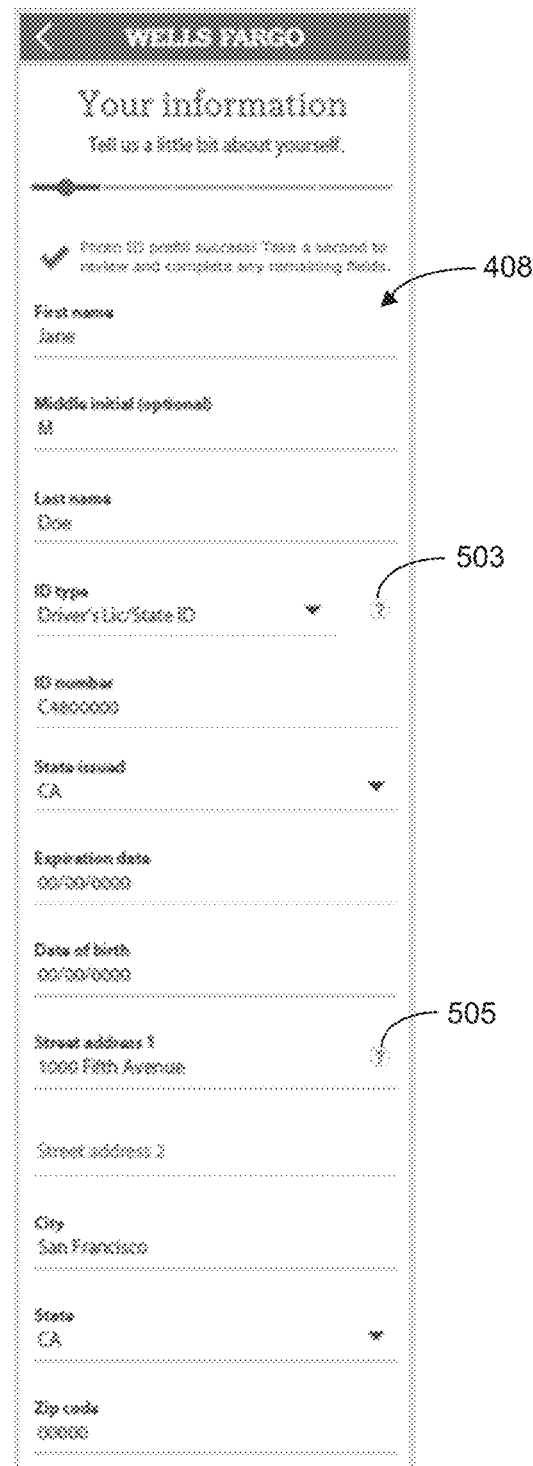
FIG. 6 is a GUI for uploading a form of identification, according to an example embodiment.
FIG. 7 is a GUI for inputting preliminary account application information, according to an example embodiment.

Referring now to FIG. 6, a GUI is shown according to an example embodiment. For example, the GUI of FIG. 6 may be displayed on the customer device 104 in response to a customer selecting the identification upload option 410 as described above. According to an example embodiment, the GUI of FIG. 6 has an identification information section 412. In the identification information section 412, the customer may select the issuer (e.g., state, country, university, military branch, etc.) of the customer's physical form of identification. Further, the identification information section 412 may have a front of identification option and a back of identification option. In some example embodiments, when a customer selects the front of identification option, the customer device 104 may launch a camera in the customer device and instruct the customer to take a picture of the front side of the customer's physical form of identification. When a customer selects the back of identification option, the customer device 104 may launch a camera (e.g., within the client application 132) in the customer device and instruct the customer to take a picture of the back of the customer's physical form of identification. The images of the physical form of identification may then be scanned, and certain information from the physical form of identification may be digitized and the preliminary account information area 408 may be partially or completely automatically populated based on the information captured from the customer's form of identification. For example, the preliminary account information area 408 may be automatically populated on a customer device 104 as shown in FIG. 7.

The GUI displayed in FIG. 6 also includes a first help icon 507 and a second help icon 509. The help icons 507, 509 may be selected to provide more information about the information that is being requested. For example if the first help icon 507 is selected, more information may be presented about what side of the ID constitutes the front side of the ID. Further, if the second help icon 509 is selected, more information may be presented about what side of the ID constitutes the back side of the ID.

Figures 8, 9:
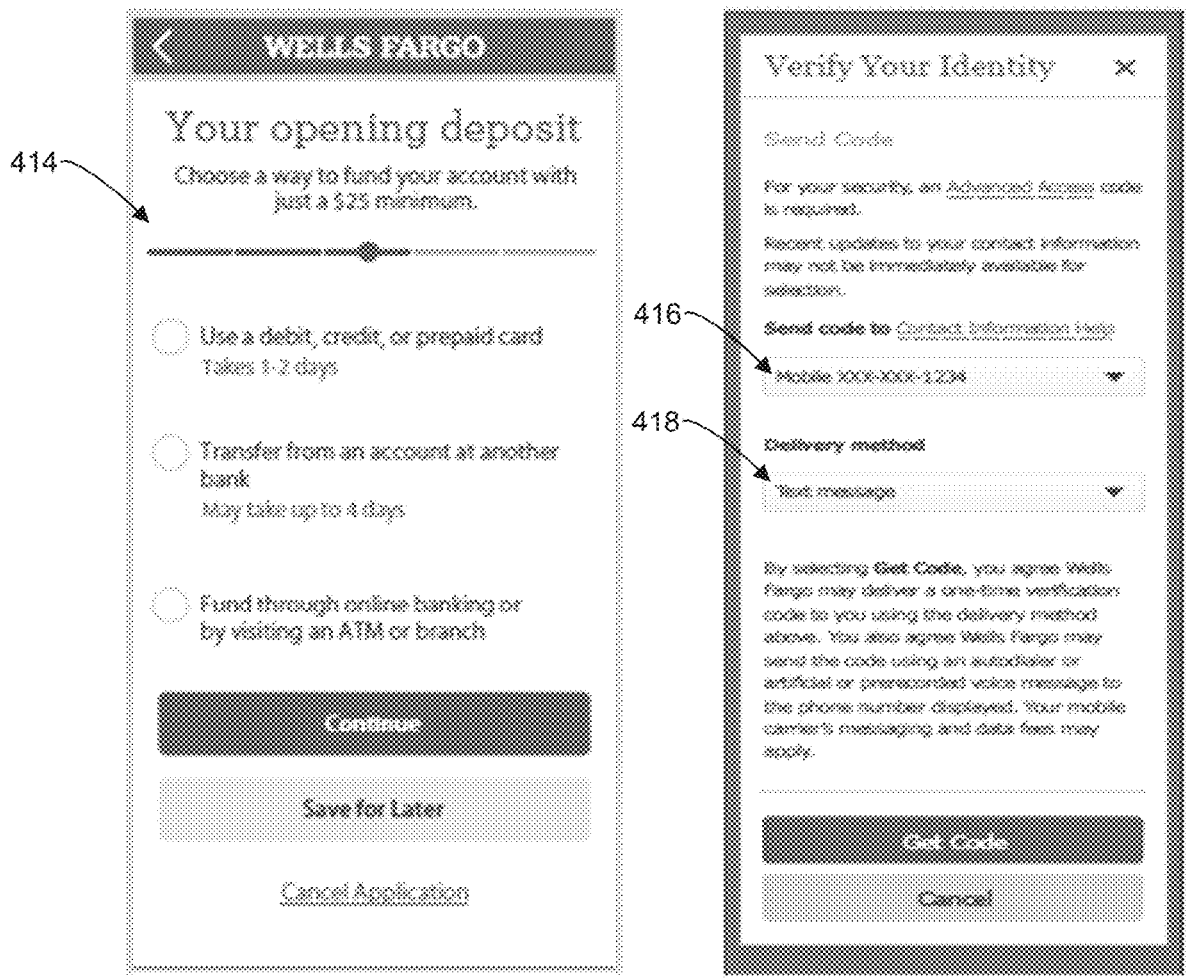
FIG. 8 is a GUI for choosing an account funding method, according to an example embodiment.
FIG. 9 is a GUI for selecting a contact confirmation code delivery method, according to an example embodiment.

Referring now to FIG. 8, a GUI is shown according to an example embodiment. For example, the GUI of FIG. 8 may be displayed on the customer device 104 in response to a customer using a customer device 104 to send preliminary account information to the provider institution computing system 106 (e.g., process 204). The GUI may include a funding selection area 414. For example, the customer may be given the option to fund the new account with a debit or credit card, the customer may transfer funds from an account at another bank, or the customer may fund his or her new account using online banking.

Referring now to FIG. 9, a GUI is shown according to an example embodiment. For example, the GUI may be displayed on a customer device 104. The GUI of FIG. 9 may be presented on the customer device 104 as a part authenticating the customer's preliminary account information (e.g., process 308). The GUI of FIG. 9 may instruct the customer to verify his or her identity by confirming a digital CIP authentication code. For example, the customer may enter his or her phone number into a contact field 416. The contact field 416 may also be automatically populated using the phone number provided by the customer when entering the preliminary account information. The GUI of FIG. 9 may also have a contact method field 418 that the customer may use to select the delivery method of the contact confirmation code (e.g., voicemail, text message, email, etc.). Once the customer has completed the contact field 416 and the contact method field 418, the customer may receive a digital CIP authentication code. For example, the customer may receive the contact confirmation code via text message on the customer device 104.

Figure 10:
FIG. 10 is a GUI for reviewing preliminary account application information, according to an example embodiment.

Referring now to FIG. 10, a GUI is shown according to an example embodiment. For example, the GUI may be displayed on a customer device 104. The GUI of FIG. 10 may have a preliminary account information review area 420. Some or all of the customer's preliminary account information that has either been entered by the customer or automatically populated may be displayed on the customer device 104 in the preliminary account information review area 420. This gives the customer an opportunity to review the preliminary account information and check it for accuracy.

Figure 11:
FIG. 11 is a GUI for confirming a customer's identity, according to an example embodiment.

Referring now to FIG. 11, a GUI is shown according to an example embodiment. For example, the GUI may be displayed on a customer device 104. The GUI may have a second ID selection area 422. For example, the second ID selection area 422 may include instructions for the customer to select the type of identification the customer would like to use as a second form of identification. The GUI shown in FIG. 11 also includes a first help icon 511 and a second help icon 513. The help icons 511, 513 may be selected to provide more information about the information that is being requested. For example if the first help icon 511 is selected, more information may be presented about the second form of ID that is required. Further, if the second help icon 513 is selected, more information may be presented about the accepted types of identification. For example, a pop-up may be displayed that includes a message that indicates the form of identification must include a photo of the customer or the signature of the customer. The pop-up may also include a list of acceptable forms of identification (e.g., a consular card, a credit card, a debit card, a driver's license, employment authentication card, employer ID, municipal ID, passport, permanent resident card, state ID, student ID, etc.).

Figure 12:
FIG. 12 is another GUI for confirming a customer's identity, according to an example embodiment.
Figures 14, 15:
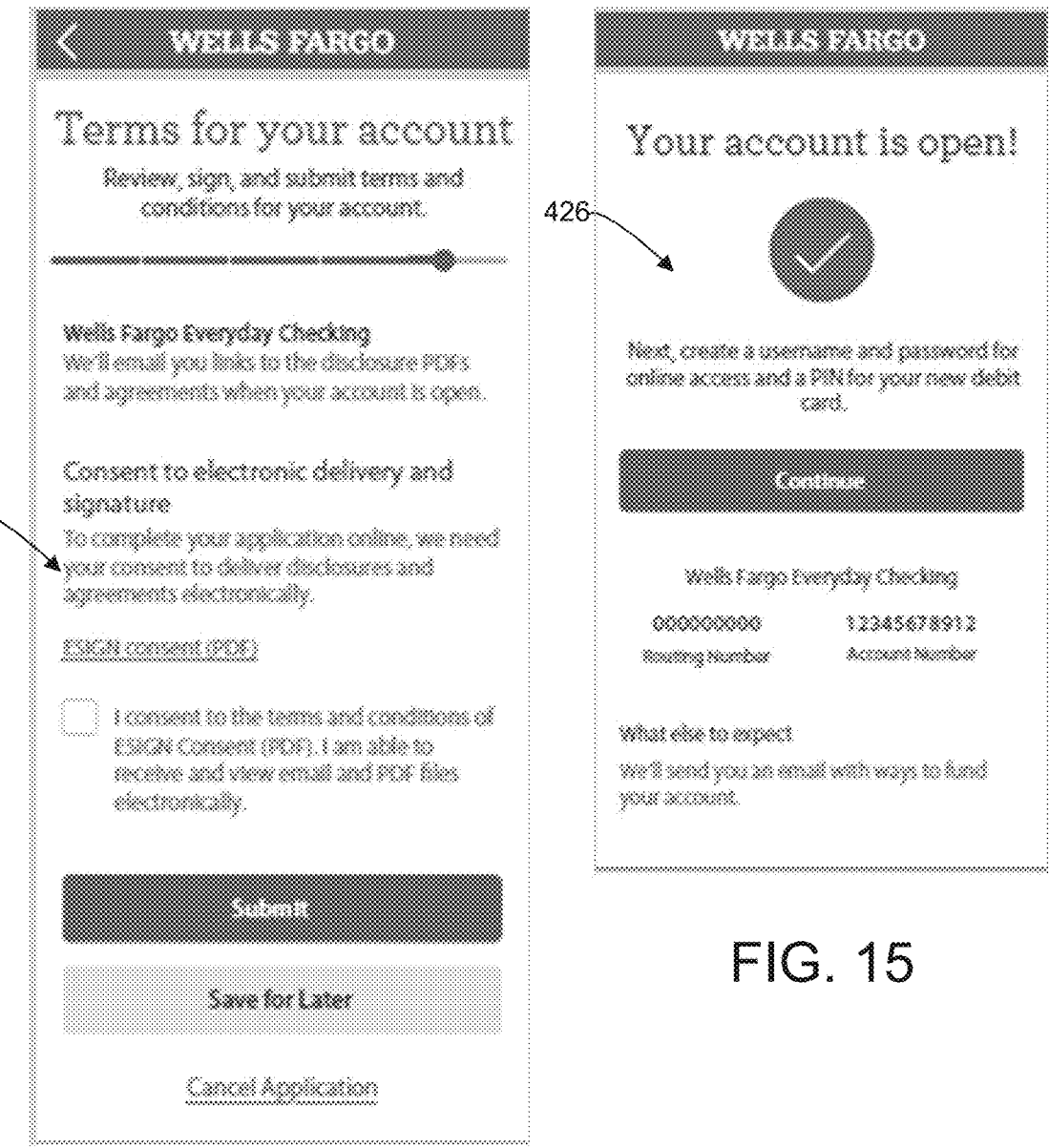
FIG. 14 is a GUI for accepting terms and conditions, according to an example embodiment.
FIG. 15 is a GUI for displaying an account opening notification, according to an example embodiment.

Referring now to FIG. 12, a GUI is shown according to an example embodiment. For example, the GUI may be displayed on a customer device 104. The GUI may have a second ID information area 415. In certain embodiments, the customer may use the customer device 104 to enter in details of a second form of identification. Alternatively, the customer device 104 may be used to scan the second form of identification and the information may be automatically entered into the second ID information area 415. The second ID information area 415 may vary based on the type of identification being used as a second identification form. For example, if the second identification form is a debit card, the second ID information area 415 may include information fields for the issuing financial institution, the card number or part of the card number (e.g., the last four digits), the issue date, and the expiration date. Once the second ID information is entered into the second ID information area 415, the second ID information may be accessed by the provider institution. In some embodiments, the provider institution may perform a risk assessment to determine if the customer and the customer's application have satisfied the provider institution's CIP and/or KYC program (e.g., decision 310). If the customer and the customer's application have satisfied the provider institution's CIP and/or KYC program, the customer may be presented the terms and conditions of having an account with the provider institution, such as shown in FIG. 14. If the customer and the customer's application has not satisfied the provider institution's CIP and/or KYC program, then a notification may be displayed on the customer device 104 as shown in FIG. 13.

Referring now to FIG. 13, a GUI is shown according to an example embodiment. For example, the GUI may be displayed on the customer device 104. The GUI may have an ID confirmation notification area 417. For example, the ID confirmation notification area 417 may present a message to the customer instructing the customer to show the customer's ID(s) to the agent of the provider institution. The ID confirmation notification area 417 may instruct the customer to present the two forms of ID that had previously been entered into the user device 104. The GUI may also include a customer information area 419. For example, the ID information (e.g., information from the first form of ID and/or the second form of ID) entered into the user device 104 may be displayed in the customer information area 419. The information displayed in the customer information area 419 may be used by the customer to ensure that the customer presents the correct form(s) of identification to the agent of the provider institution. Further, the information displayed in the customer information area 419 may be viewed by the agent of the provider institution when the agent is confirming the customer's identity. For example, the customer may show the agent the customer device 104 along with the customer's form(s) of identification. In certain embodiments, the customer information area 419 may be scaled such that the entire customer information area 419 is viewable on a small mobile screen (e.g., a cell phone screen) on the customer device 104. In this example embodiment, the entire customer information area 419 may be viewed by the agent of the provider institution without scrolling on the customer device 104. Further, the GUI has a second code area 421. For example, the customer may enter in the second code into the second code area 421 such that the second code may be captured by the customer device 104. Alternatively, the second code may be scanned or otherwise received by the customer device 104 such that the second code is automatically populated into the second code area 421. Once the second code is entered into the second code area 421, the second code may be accessed by the provider institution.

The GUI shown in FIG. 13 also includes a first help icon 519, a second help icon 521, and a third help icon 523. The help icons 519, 521, 523 may be selected to provide more information about the information that is being requested. For example if the first help icon 519 is selected, more information may be presented about the primary ID may be displayed on the customer device 104. For example, a pop-up may be displayed on the screen of the customer device 104 that indicates that the Primary ID is the ID that the customer entered in the application. Further, if the second help icon 521 is selected, more information may be presented about the secondary ID may be displayed on the customer device 104. For example, a pop-up may be displayed on the screen of the customer device 104 that indicates that the second ID is the ID that was entered later in the application. Further, if the third help icon 523 is selected, more information may be displayed about the code (e.g., the second code) that is being required. For example, a pop-up may be displayed on the screen that informs the customer that the code indicates to the provider institution that the agent has verified the customer's form(s) of identification, which helps the provider institution process the customer's application.

Referring now to FIG. 14, a GUI is shown according to an example embodiment. Fr example, the GUI may be displayed on a customer device 104. The GUI shown in FIG. 14 includes a terms and conditions area 424 that may display some or all of the terms and conditions of the provider institution. Further, there may be a consent box, were the customer may consent and opt into the terms and conditions. Once the customer consents to the terms and conditions, a new account may be opened for the customer (e.g., process 312). For example, the GUI shown in FIG. 15 includes an account status area 426 where the status of the customer's application may be displayed. For example, the account status area 426 may notify the customer that the account has been opened, at which point the customer may access his or her account.

Referring back to the risk assessment that may be performed after the customer enters the digital CIP authentication code, if it is determined that the customer has not satisfied the provider institution's CIP and/or KYC program, a notification may be displayed on the customer device 104 indicating that the customer must present a physical form, or multiple forms, of identification to an agent of the provider institution (e.g., process 314). The customer may then present a form of identification and complete any other authentication instructions that are presented to the customer (e.g., process 208). In response to verifying the customer's identity with the agent, the agent may provide the customer with a second code (e.g., process 316). The second code may then be received by the customer device 104 (e.g., process 210). The customer device 104 may then send the second code (e.g., process 212) to the provider institution computing system 106 and/or provider agent device 254 (e.g., process 318). Once the provider institution has verified the second code, the terms and conditions may be presented to the customer, such as described above with respect to FIG. 14. Once the customer consents to the terms and conditions, the provider institution computing system 106 may open an account (e.g., process 320) and a notification may be sent to the customer that the account has been opened, as described above with respect to FIG. 15. The customer may then access his or her account (e.g., process 214).

Figure 16:
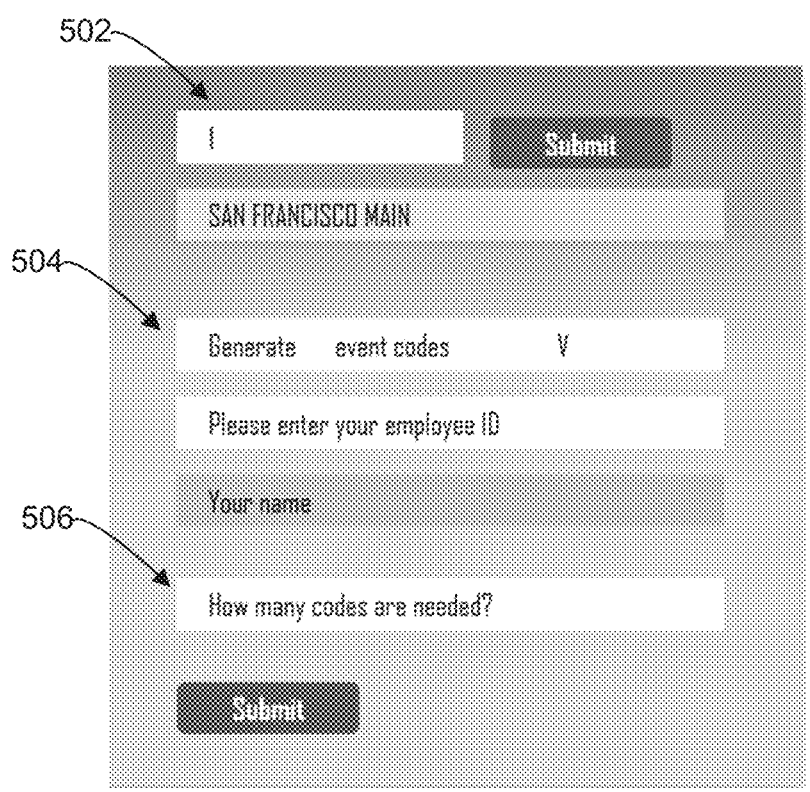
FIG. 16 is a GUI for generating codes, according to an example embodiment.

Referring now to FIG. 16, a GUI is shown according to an example embodiment. For example, the GUI may be displayed on a provider agent device 254. For example, the GUI may be displayed on a webpage or within an application. In some embodiments, the GUI of FIG. 16 may be displayed within the provider application 232. The GUI shown in FIG. 16 may be used, for example, to create a second code (e.g., the second code used at process 318, the account application authentication code used at process 210). In some embodiments, the GUI includes a location field 502. An agent of the provider institution may use the provider agent device 254 to enter a location into the location field 502. The location may be of a local branch, mixer, an advertisement, etc. The location entered into the location field 502 may then be included as a unique identifier when the second code is generated. The GUI may also include and agent identification area 504. An agent of the provider institution may use the provider agent device 254 to enter information identifying into the agent identification area 504. For example, the agent identification area may be updated to include the agent's name, agent's identification number, and/or any other information that may identify the agent. The information entered into the agent identification area 504 may be included as a unique identifier when the second code is generated. The GUI may also include a quantity field 506. An agent of the provider institution may use the provider agent device 254 to enter a number of desired codes that the agent would like to create. For example, the agent may know how many or be able to estimate how many customers may attend a mixer. It should be appreciated that the GUI may include other fields that may be filled with information that may be included as a unique identifier in the second code.

In certain embodiments, such as when the agent is at an off-site (i.e., not at a local branch) mixer, the agent may use the GUI shown in FIG. 16 to generate multiple second codes (e.g., predetermined account application authentication codes) before the mixer starts, thereby accelerating the account opening process. However, an agent may also use the provider agent device 254 to generate second codes in real time while at the off-site mixer. When the agent is at a local branch and helping customers create new accounts, the agent may use the GUI of FIG. 16 to generate a second code in real time for a customer upon verifying a customer's identity in accordance with the provider institution's CIP and/or KYC program.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instructions execution. Each processor may be implemented as one or more general-purpose processors, application-specific integrated circuits (ASICs), field-programmable gate arrays (FPGAs), digital signal processors (DSPs), or other suitable electronic data processing components structured to execute instructions provided by memory. The one or more processors may take the form of a single-core processor, multi-core processor (e.g., a dual-core processor, triple-core processor, quad-core processor, etc.), microprocessor, etc. In some embodiments, the one or more processors may be external to the apparatus, for example the one or more processors may be a remote processor (e.g., a cloud-based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

An exemplary system for implementing the overall system or portions of the embodiments might include a general purpose computing in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method processes, it is understood that the order of these processes may differ from what is depicted. For example, two or more processes may be performed concurrently or with partial concurrence. Also, some method processes that are performed as discrete processes may be combined, processes being performed as a combined process may be separated into discrete processes, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching processes, correlation processes, comparison processes and decision processes.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. An account opening system comprising:
 a network interface circuit structured to facilitate data transmission over a network; and
 a processing circuit comprising one or more processors coupled to non-transitory memory, wherein the processing circuit is configured to:
  provide an account application instruction to a customer device operated by a customer, wherein the account application instruction is provided to the customer device in response to a first code being captured by the customer device, wherein capturing the first code causes a browser or an application to be launched on the customer device and wherein the first code includes a first unique identifier embedded in the first code;
  receive preliminary account information from the customer device via the browser or the application on the customer device;

receive a second code from the customer device, wherein the second code is provided to the customer device in response to a verification of an identity of the customer, and wherein the second code is generated prior to verifying the identity of the customer and includes a second unique identifier;

verify the second code by matching the second unique identifier to the first unique identifier; and open an account in response to verifying the second code, wherein the account may be accessed by the customer device.

2. The account opening system of claim 1, wherein the processing circuit is further configured to:

provide an authentication instruction to the customer device prompting for the verification of the identity of the customer at a specific location.

3. The account opening system of claim 1, wherein the second code is a predetermined authentication code that is generated prior to the first code being captured by the customer device.

4. The account opening system of claim 1, wherein the second code comprises an authentication code generated on a provider device in real time based on the verification of the identity of the customer.

5. The account opening system of claim 3, wherein the second code further includes a unique identifier specific to an agent of a provider institution.

6. The account opening system of claim 3, wherein the second code further includes a unique identifier specific to a branch location associated with a provider institution.

7. The account opening system of claim 1, wherein the second code is provided to the customer device by NFC transfer.

8. The account opening system of claim 1, wherein the second code is embedded with a time expiration period parameter such that if the second code is not received with a predefined amount of time of the first code, the second code is not validated.

9. The account opening system of claim 1, wherein the first unique identifier identifies at least one of a location, a time, a date, or an agent identity of an agent.

* * * * *